US010870348B2

(12) United States Patent
Dagley et al.

(10) Patent No.: US 10,870,348 B2
(45) Date of Patent: Dec. 22, 2020

(54) DETECTING AND DISABLING A VEHICLE LEFT RUNNING WHILE PARKED

(71) Applicant: Capital One Services, LLC, McLean, VA (US)

(72) Inventors: Geoffrey Dagley, McLean, VA (US); Qiaochu Tang, McLean, VA (US); Jason Hoover, McLean, VA (US); Micah Price, McLean, VA (US); Stephen Wylie, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/285,843

(22) Filed: Feb. 26, 2019

(65) Prior Publication Data

US 2020/0269688 A1    Aug. 27, 2020

(51) Int. Cl.
*B60K 28/10* (2006.01)
*F24F 11/00* (2018.01)
(Continued)

(52) U.S. Cl.
CPC .............. *B60K 28/10* (2013.01); *E05F 15/72* (2015.01); *F24F 11/0001* (2013.01);
(Continued)

(58) Field of Classification Search
CPC ..... B60K 28/10; G06N 20/20; F24F 11/0001; F24F 11/63; F24F 2011/0002;
(Continued)

(56) References Cited

U.S. PATENT DOCUMENTS

| 5,333,703 A * | 8/1994 | James | B60K 28/10 180/271 |
| 6,559,775 B1 * | 5/2003 | King | E05F 15/40 340/10.1 |

(Continued)

OTHER PUBLICATIONS

David Jeans and Majlie De Puy Kamp, "Deadly Convenience: Keyless Cars and Their Carbon Monoxide Toll," The New York Times, May 12, 2018, 9 pages, https://www.nytimes.com/2018/05/13/business/deadly-convenience-keyless-cars-and-their-carbon-monoxide-toll.html?nl=top-stories&nlid=16324671ries&ref=cta.

*Primary Examiner* — David Hamaoui
(74) *Attorney, Agent, or Firm* — Harrity & Harrity, LLP

(57) ABSTRACT

A sensor device may detect that a vehicle is running in an enclosed environment monitored by the sensor device based on one or more artificial intelligence algorithms and detect that the vehicle is emitting exhaust into the enclosed environment based on the artificial intelligence algorithms. To ventilate the exhaust, the sensor device generates a first command that causes a door in the enclosed environment to open based on detecting that the vehicle is emitting the exhaust into the enclosed environment. Furthermore, to stop the vehicle from running and/or emitting the exhaust into the enclosed environment, the sensor device may generate a second command that causes an ignition switch on the vehicle to disengage. The sensor device transmits the first command and the second command to one or more devices for execution such that the exhaust is ventilated from the enclosed environment and the ignition switch on the vehicle is disengaged.

20 Claims, 10 Drawing Sheets

(51) Int. Cl.
  *G06N 20/20* (2019.01)
  *E05F 15/72* (2015.01)
  *H04L 29/08* (2006.01)
  *F24F 11/63* (2018.01)
  *F24F 110/72* (2018.01)
(52) U.S. Cl.
  CPC .............. *F24F 11/63* (2018.01); *G06N 20/20* (2019.01); *H04L 67/12* (2013.01); *E05Y 2900/106* (2013.01); *F24F 2011/0002* (2013.01); *F24F 2110/72* (2018.01)
(58) Field of Classification Search
  CPC ....... F24F 2110/72; H04L 67/12; E05F 15/72; E05Y 2900/106
  See application file for complete search history.

(56) References Cited

U.S. PATENT DOCUMENTS

| | | | |
|---|---|---|---|
| 7,183,933 B2 | 2/2007 | Dzurko et al. | |
| 7,426,429 B2* | 9/2008 | Tabe | B60R 22/48 180/273 |
| 8,375,913 B2* | 2/2013 | Kwiecinski | F02N 11/101 123/179.2 |
| 8,669,878 B1 | 3/2014 | Vantilburg | |
| 8,803,696 B1* | 8/2014 | Dunyan | E05F 15/668 340/632 |
| 8,977,476 B2* | 3/2015 | Kirshon | F02N 11/0822 701/112 |
| 9,053,626 B2* | 6/2015 | Cristoforo | G01N 33/0073 |
| 9,556,812 B2* | 1/2017 | Ozkan | F02D 41/042 |
| 9,803,412 B1* | 10/2017 | Fontanini | E05F 15/79 |
| 9,858,806 B2* | 1/2018 | Geerlings | G08C 17/02 |
| 9,905,122 B2* | 2/2018 | Sloo | G06K 9/00744 |
| 10,097,122 B1* | 10/2018 | Schwulst | H02P 9/04 |
| 10,415,486 B2* | 9/2019 | Schwulst | F02D 29/06 |
| 10,590,878 B2* | 3/2020 | Schwulst | F02D 17/04 |
| 2014/0074383 A1* | 3/2014 | Frey | G08B 21/14 701/110 |
| 2014/0118111 A1* | 5/2014 | Saladin | E05F 15/77 340/7.51 |
| 2015/0127224 A1* | 5/2015 | Tabe | B60R 22/48 701/45 |
| 2016/0104374 A1* | 4/2016 | Ypma | G07C 9/20 340/5.25 |
| 2018/0056988 A1* | 3/2018 | Heil, Jr. | B60W 30/06 |
| 2018/0197029 A1* | 7/2018 | Ali | G06K 9/209 |
| 2020/0141375 A1* | 5/2020 | Lee | F02N 11/0811 |

* cited by examiner

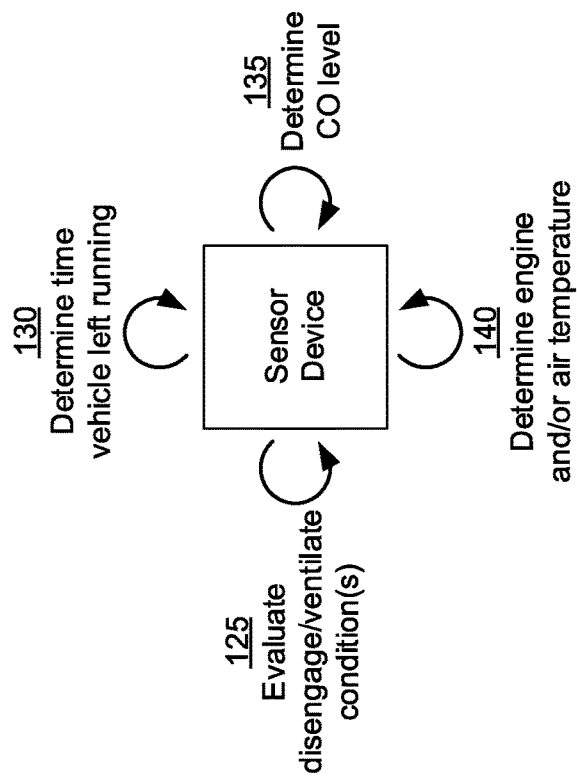
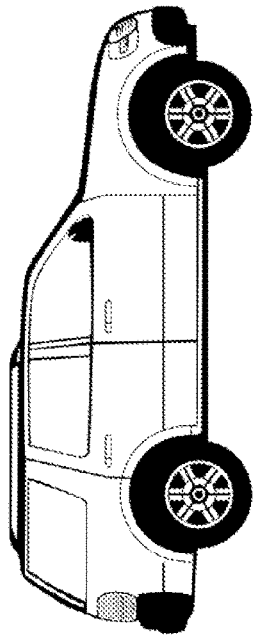
FIG. 1C

DETECTING AND DISABLING A VEHICLE LEFT RUNNING WHILE PARKED

BACKGROUND

A sensor is an electronic device that takes input from a physical environment and produces a signal that represents information about the physical environment. Smart sensors refer to a specific class of sensors that may also have built-in compute resources (e.g., a processor, communication interface, and/or the like), which may provide capabilities to interpret and/or take appropriate action based on the signal that represents information about the physical environment. Sensors in general, and smart sensors in particular, can be used as monitoring and control mechanisms in various environments, including Internet of Things (IoT) environments that extend network connectivity to vehicles, home appliances, medical devices, and/or the like.

SUMMARY

According to some implementations, a method may include detecting, at a sensor device, that a vehicle is running in an enclosed environment monitored by the sensor device based on one or more artificial intelligence algorithms, and detecting, at the sensor device, that the vehicle is emitting exhaust into the enclosed environment monitored by the sensor device based on the one or more artificial intelligence algorithms. The method may include generating, at the sensor device, a first command that causes a door in the enclosed environment to open based on detecting that the vehicle is emitting the exhaust into the enclosed environment, wherein the first command is generated to ventilate the exhaust. The method may include generating, at the sensor device, a second command that causes an ignition switch on the vehicle to disengage, wherein the second command is generated to stop the vehicle from emitting the exhaust into the enclosed environment. The method may include transmitting, by the sensor device, the first command and the second command to one or more devices for execution such that the exhaust is ventilated from the enclosed environment and the ignition switch on the vehicle is disengaged.

According to some implementations, a sensor device may include one or more memories, and one or more processors, communicatively coupled to the one or more memories, to detect that a vehicle is running in an environment monitored by the sensor device based on one or more artificial intelligence algorithms configured to evaluate a set of inputs related to one or more of a state of the vehicle or a state of the environment. The one or more processors may determine an amount of time that the vehicle has been left running, generate a command that causes the vehicle to turn off based on determining that the amount of time that the vehicle has been left running satisfies a threshold value, and transmit the command to one or more devices for execution such that the vehicle is turned off.

According to some implementations, a non-transitory computer-readable medium may store instructions that include one or more instructions that, when executed by one or more processors of a sensor device, cause the one or more processors to detect that a vehicle is running in an environment monitored by the sensor device based on one or more artificial intelligence algorithms. The one or more instructions may cause the one or more processors to detect that the vehicle is emitting exhaust into the environment monitored by the sensor device based on the one or more artificial intelligence algorithms, and to determine, based on the one or more artificial intelligence algorithms, that a user intentionally left the vehicle running to warm or cool the vehicle prior to driving. The one or more instructions may cause the one or more processors to generate a first command that causes ventilation of the environment based on determining that the environment is enclosed in combination with one or more of: an amount of time that the vehicle has been left running satisfying a first threshold value, or a carbon monoxide level in the environment satisfying a second threshold value. The one or more instructions may cause the one or more processors to generate a second command that causes the vehicle to turn off based on determining that an engine temperature at the vehicle satisfies a third threshold value.

BRIEF DESCRIPTION OF THE DRAWINGS

FIGS. 1A-1E are diagrams of one or more example implementations described herein.

DETAILED DESCRIPTION

Figure 1A:
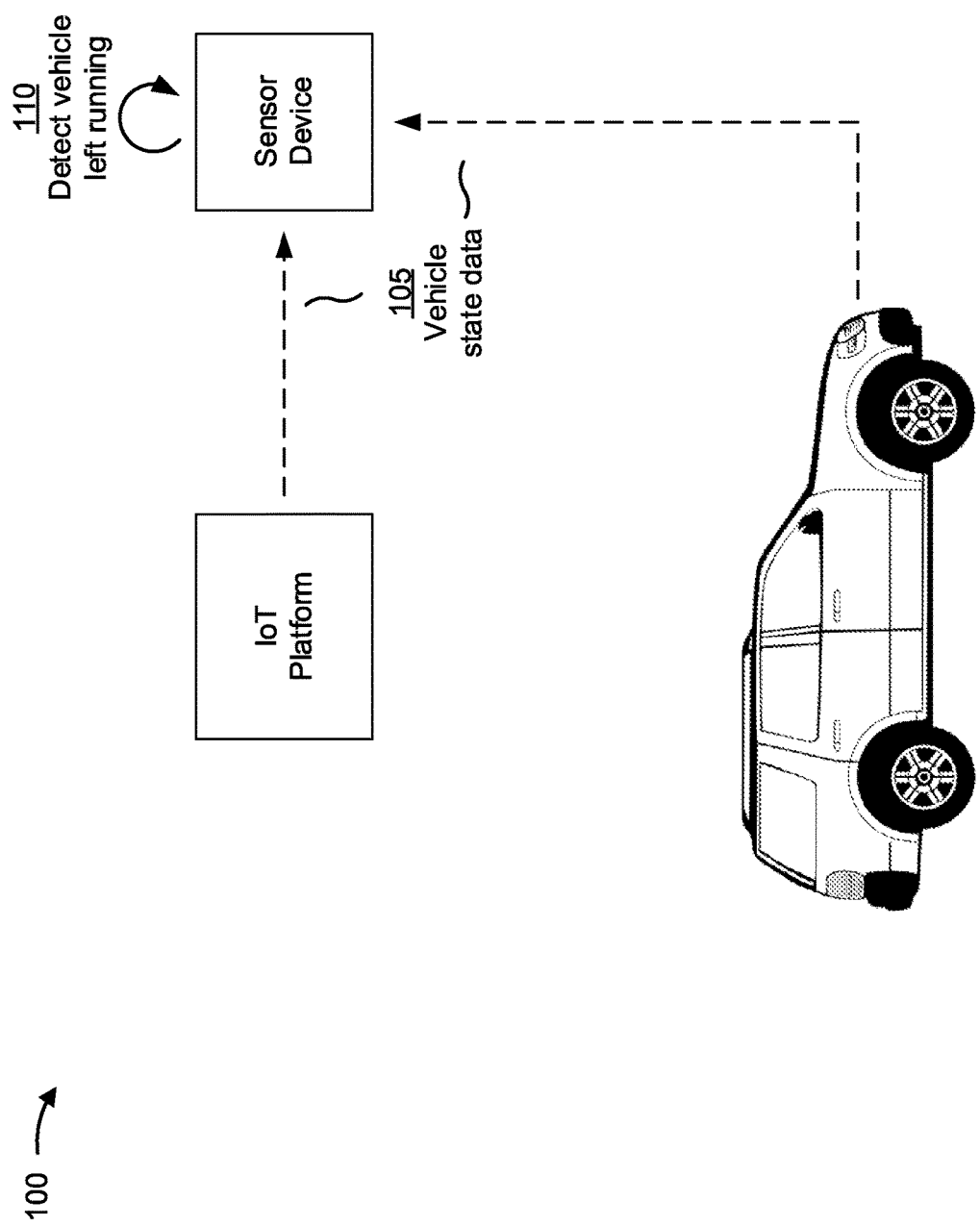

The following detailed description of example implementations refers to the accompanying drawings. The same reference numbers in different drawings may identify the same or similar elements.

When a vehicle with an internal combustion engine is left running (or "idling"), the vehicle produces exhaust that could be harmful or even fatal. In particular, in addition to including various non-toxic compounds such as nitrogen gas and water vapor, vehicle exhaust includes carbon monoxide produced from incomplete combustion. Carbon monoxide is a colorless and odorless gas that can have serious health consequences when inhaled, including hypoxic injury, nervous system damage, or death. The risk of potential injury becomes greater in an enclosed space or an attached building (e.g., a house), as a lack of sufficient ventilation can result in carbon monoxide accumulating to dangerous levels and/or seeping into the attached building. Furthermore, whether the vehicle is a traditional vehicle with an internal combustion engine only, an electric vehicle with an electric motor only, or a hybrid electric vehicle with both an internal combustion engine and an electric motor, leaving the vehicle running may lead to wasted energy (e.g., fuel, electricity, battery life, and/or the like).

Recent developments in technology have increased the potential to inadvertently leave a vehicle running. For example, many vehicles are now equipped with keyless (or push-button) starter mechanisms, which allow drivers to start vehicles with a button press provided that an electronic key fob is present (e.g., in or near the vehicle). Accordingly, whereas the driver of a traditional vehicle must manually turn and remove a key to turn the engine off, keyless technology combined with newer, quieter engines can lull drivers into mistakenly thinking that the vehicle has stopped running or failing to realize that the vehicle is still running. Furthermore, drivers may be prone to inadvertently leaving an electric or hybrid electric vehicle running because the vehicle may make little to no sound when operating on battery power. In such cases, other than dashboard lights, the driver may have scarce if any information to remind them that the vehicle is running. In a pure electric vehicle, this could eventually lead to battery drain, excessive electricity usage (e.g., where the vehicle is left running while plugged into a power source), and/or the like. Furthermore, a hybrid electric vehicle poses an additional threat, as the internal combustion engine may switch on after the battery is depleted, which could result in dangerous accumulation of carbon monoxide in addition to wasted energy.

Some implementations described herein may include a sensor device that can monitor an environment where a vehicle can be parked (e.g., a garage, a driveway, a curbside parking space, and/or the like) and detect and disable a vehicle that has been left running while parked in the monitored environment. In some implementations, the sensor device may detect that the vehicle has been left running based on various criteria, which may include information related to a state of the vehicle, information related to a state of the monitored environment, information related to how the vehicle is expected to behave when the vehicle is on versus off, observed and/or expected patterns in user behavior, observed and/or expected locations of one or more devices (e.g., whether and/or how long a key fob, a mobile phone, and/or the like is located in the vehicle), and/or the like. For example, the sensor device may detect that the vehicle has been left running based on receiving and/or detecting one or more radio frequency signals and/or electromagnetic fields that the vehicle produces only when turned on. Additionally, or alternatively, the sensor device may include light or visual sensing capabilities, whereby the sensor device may detect that the vehicle has been left running based on detecting light emitted by the vehicle (e.g., from an instrument panel, an infotainment system, an interior dome and/or courtesy lights, exterior lights, and/or the like). Additionally, or alternatively, the sensor device may have capabilities to detect a heat signature of the vehicle (e.g., based on infrared emissions, a forward-looking infrared radiometer (FLIR) camera, and/or the like detecting an increased temperature in an area corresponding to the vehicle). In such cases, the heat signatures may be mapped to a color gradient that can be used in conjunction with one or more image processing techniques to detect that the vehicle has been left running.

In some implementations, based on detecting that the vehicle has been left running, the sensor device may evaluate the various criteria to determine whether to turn the vehicle off. For example, in some implementations, the sensor device may determine whether to turn the vehicle off based on a duration of time that the vehicle has been left running, a carbon monoxide level in the environment, a temperature associated with the vehicle (e.g., an engine temperature, an interior air temperature, and/or the like), user behavior that is typical and/or expected at a time that the vehicle was left running, a location and/or a set of timestamped locations associated with one or more devices and/or one or more users, and/or the like. Accordingly, based on the evaluation of the various criteria, the sensor device may turn the vehicle off (e.g., based on a prediction that the vehicle was inadvertently left running, that the user is unlikely to return to the vehicle within a threshold time, that the running vehicle poses a safety hazard, and/or the like).

In this way, by turning the vehicle off, energy may be conserved because the vehicle would otherwise be consuming fuel, battery power, electricity, and/or other energy resources while running. Furthermore, if the vehicle has an internal combustion engine, turning the vehicle off may reduce the risk of carbon monoxide poisoning and/or other health consequences that could result from a person inhaling exhaust from the vehicle. Further still, because the environment where the vehicle was left running may be accessible to passersby who could potentially enter and drive away with the vehicle, the risk of vehicle theft may be reduced.

In some implementations, the sensor device may be configured to determine to ventilate the environment (e.g., based on whether the environment is enclosed, whether the vehicle is emitting exhaust, and/or whether other conditions indicate a potential risk of carbon monoxide poisoning and/or other health consequences from inhaling vehicle exhaust). For example, in some implementations, the sensor device may be deployed at any suitable location that allows the sensor device to determine whether one or more doors and/or windows in the environment are open or closed (e.g., the sensor device may be coupled to a garage door via a switch, a garage door opener that outputs information indicating whether the door is open or closed, an Internet of Things platform that outputs information indicating whether the doors and/or windows are open or closed, and/or the like). Additionally, or alternatively, the sensor device may receive information that can be used to determine whether the environment is enclosed from a communication device associated with the vehicle (e.g., images and/or image processing data obtained from one or more onboard cameras, which could be analyzed to detect a closed garage door, estimate a size of the environment, and/or the like). Accordingly, based on determining that there is a risk of a person inhaling vehicle exhaust or toxic compounds contained in vehicle exhaust, the sensor device may further initiate one or more actions to ventilate the environment (e.g., opening the garage door, turning on a fan, and/or the like).

In this way, by ventilating the environment of exhaust that a running vehicle may have emitted into the environment, the risk of carbon monoxide poisoning and/or other health consequences that could result from inhaling the exhaust may be reduced, potentially saving lives when a vehicle is left running in the environment.

FIGS. 1A-1E are diagrams of one or more example implementations 100 described herein. As shown in FIGS. 1A-1E, a sensor device may be deployed to monitor an environment where a vehicle can be parked (e.g., a garage, a driveway, a curbside parking space, and/or the like) such that the sensor device can detect a vehicle that has been left running based on various criteria. For example, in some implementations, the criteria may include information related to a state of the vehicle, information related to a state of the monitored environment, information related to how the vehicle is expected to behave when the vehicle is on versus off, observed and/or expected patterns in user behavior, observed and/or expected locations of one or more devices (e.g., devices that a user typically carries while driving, such as a key fob, a mobile phone, and/or the like), and/or the like.

In some implementations, the sensor device may be configured to utilize one or more artificial intelligence algorithms to determine whether the vehicle is running. For example, in some implementations, the sensor device may be configured with one or more machine learning models that have been trained to determine or otherwise indicate whether the vehicle is running based on a set of inputs that may be related to the state of the vehicle, the state of the environment, observed patterns in user behavior, observed locations of one or more devices, and/or the like. Additionally, or alternatively, the sensor device may be implemented as part of a rules-based system (e.g., a domain-specific expert system and/or the like), which may be configured with a rule base containing one or more rules and an inference engine, a semantic reasoner, and/or the like to detect that the vehicle is running based on the set of inputs satisfying one or more rules. In some implementations, the rules-based system may employ rule-based machine learning to derive, identify, learn, or otherwise evolve the one or more rules contained in the rule base.

In some implementations, the set of inputs related to the state of the vehicle, the state of the environment, the observed patterns in user behavior, the observed locations of one or more devices, and/or the like may additionally, or alternatively, be evaluated at a processing node separate from the sensor device (e.g., an Internet of Things (IoT) platform, a server, a cloud computing node, a gateway node configured to aggregate and/or analyze data received from one or more edge nodes, and/or the like). In such cases, the sensor device may provide the set of inputs to the processing node, which may determine and indicate to the sensor device whether the vehicle is running based on the set of inputs and the one or more artificial intelligence algorithms (e.g., based on one or more machine learning models, one or more rules, and/or the like). Furthermore, where the processing node used to evaluate the set of inputs is a gateway node logically situated between the sensor device and an IoT platform, a server, a cloud computing node, and/or the like, the gateway node may aggregate and analyze data from one or more edge nodes (including the sensor device), which may conserve network resources by avoiding or reducing a need to push data to the IoT platform, the server, the cloud computing node, and/or the like. In this way, by processing the data at the gateway, the sensor device does not need to be aware of the cloud, which may allow the sensor device to be implemented with a simpler network stack, fewer onboard radios, and/or the like.

Accordingly, as described herein, the sensor device may use the one or more machine learning models, the rules-based system, and/or the like in combination with one or more artificial intelligence algorithms (e.g., machine learning, deep learning, rule-based inferencing, semantic reasoning, and/or the like) to determine whether the vehicle is running in the environment and/or emitting exhaust into the environment based on various criteria (e.g., the state of the vehicle, the state of the environment, and/or the like). Furthermore, assuming the vehicle is determined to be running, the sensor device may evaluate the various criteria using the one or more artificial intelligence algorithms to predict whether to turn off the vehicle and/or ventilate the environment. For example, in some implementations, the sensor device may generate or otherwise obtain one or more models of the vehicle, the environment monitored by the sensor device, behavior patterns of one or more users, and/or the like. In some implementations, the one or more models may be trained using information that includes various parameters (e.g., vehicle parameters, environmental parameters, user behavior patterns, device locations, and/or the like) mapped to states in which the vehicle is running, switched off, emitting exhaust, and/or the like. Furthermore, in some implementations, the one or more models may be trained using information that includes various parameters mapped to states in which exhaust is present in the environment, the environment is ventilated, the environment is enclosed, and/or the like.

In this way, the sensor device may identify characteristics associated with a vehicle that has been left running in the environment monitored by the sensor device and characteristics that indicate whether there may be a need to turn off the vehicle and/or ventilate the environment, as described herein. Based on applying a rigorous and automated process to detect and disable a running vehicle and/or ventilate an environment in which the vehicle has been left running, the sensor device enables recognition, classification, and/or identification of thousands or millions of data points that may be relevant to the state of the vehicle, the state of the environment, user behavior, and/or the like, thereby increasing an accuracy and consistency of predictions as to whether to turn off the vehicle and/or ventilate the environment.

In some implementations, the sensor device may use a classification technique, such as a logistic regression classification technique, a random forest classification technique, a gradient boosting machine learning (GBM) technique, a rule-based classification technique, and/or the like, to determine a categorical outcome (e.g., that the vehicle is running, that the vehicle is switched off, that the vehicle is emitting exhaust, that the vehicle is not emitting exhaust, that the environment is ventilated, that the environment is enclosed, and/or the like). Additionally, or alternatively, the sensor device may use a naïve Bayesian classifier technique. In this case, the sensor device may perform binary recursive partitioning to split data of a minimum feature set into partitions and/or branches and use the partitions and/or branches to perform predictions (e.g., that the user inadvertently left the vehicle running and is unlikely to return to the vehicle within a threshold time period, that a user started the vehicle to warm or cool the vehicle, that the user will likely return to the vehicle before carbon monoxide accumulates to a dangerous level, and/or the like). Based on using recursive partitioning, the sensor device may reduce utilization of computing resources relative to manual, linear sorting and analysis of data points, thereby enabling the use of thousands, millions, or billions of data points to train a model, which may result in a more accurate model than using fewer data points.

Additionally, or alternatively, where the test data includes image data, video data, and/or the like, the test data may be processed using a computer vision technique, such as a convolutional neural network technique to assist in classifying test data (e.g., image or video data showing that a garage door is open or closed, image or video data showing that a display of an infotainment system is turned on, a color gradient mapped to heat or infrared emissions, and/or the like) into a particular class (e.g., classes indicating that the vehicle is running, the environment is enclosed, and/or the like). In some cases, the computer vision technique may include using an image recognition technique (e.g., an Inception framework, a ResNet framework, a Visual Geometry Group (VGG) framework, and/or the like), an object detection technique (e.g., a Single Shot Detector (SSD) framework, a You Only Look Once (YOLO) framework, and/or the like), an objection motion technique (e.g., an optical flow framework and/or the like), a knowledge-based computer vision (KBCV) technique, and/or the like.

Additionally, or alternatively, the sensor device may use one or more machine learning models that have been trained using a supervised training procedure that includes receiving input to the one or more models from a subject matter expert, which may reduce an amount of time, an amount of processing resources, and/or the like to train the one or more models relative to an unsupervised training procedure. In some implementations, the one or more machine learning models may be trained using one or more other model training techniques, such as a neural network technique, a latent semantic indexing technique, and/or the like. For example, the machine learning models may be trained using an artificial neural network processing technique (e.g., using a two-layer feedforward neural network architecture, a three-layer feedforward neural network architecture, and/or the like) to perform pattern recognition with regard to whether or not certain patterns of vehicle parameters, environmental parameters, user behaviors, device locations, and/or the like can be used to detect a running vehicle, exhaust in the environment, and/or the like. In this case, using the artificial neural network processing technique may improve an accuracy of the one or more models by being more robust to noisy, imprecise, and/or incomplete data, and by enabling the sensor device to detect patterns and/or trends undetectable to human analysts or systems using less complex techniques.

Accordingly, the sensor device may use any number of artificial intelligence algorithms, including machine learning techniques, deep learning techniques, rules-based techniques, and/or the like to determine whether the vehicle is running, and if so, to further determine whether to turn the vehicle off and/or ventilate the environment if the running vehicle is emitting exhaust into the environment.

As shown in FIG. 1A, and by reference number 105, the sensor device may receive the set of inputs related to the state of the vehicle. For example, as shown in FIG. 1A, the set of inputs related to the state of the vehicle may be received from the vehicle (e.g., where the vehicle is equipped with communication capabilities) and/or from the IoT platform (e.g., a connected vehicle platform that can communicate with and/or control the vehicle, a connected home platform that can monitor and control lighting, climate such as temperature, ventilation, and/or the like, appliances, access control and alarm systems such as a garage door system, exterior doors, and/or the like). Additionally, or alternatively, the sensor device may be configured to sense or otherwise detect one or more physical phenomena in the monitored environment. For example, in some implementations, the sensor device may include a radio frequency (RF) signal detector, a light sensor, an accelerometer, a temperature sensor, a smoke sensor, a gas sensor (e.g., a carbon monoxide sensor), a proximity sensor, a magnetic sensor, an audio sensor, an electromagnetic sensor, a chemical sensor, a humidity sensor, a moisture sensor, and/or the like.

In some implementations, when the sensor device receives vehicle state data from the vehicle, the vehicle state data may generally indicate whether the vehicle is turned on. For example, the vehicle may be a connected car equipped with one or more communication devices that enable communication via a wireless local area network (WLAN), a wireless wide area network (WWAN), a wireless personal area network (WPAN), and/or the like. In general, the communication devices may enable the vehicle to communicate over a network and/or with one or more other devices (e.g., to support vehicle-to-everything (V2X) communications, such as vehicle-to-vehicle (V2V) communications, vehicle-to-infrastructure (V2I) communications, vehicle-to-network (V2N) communications, and vehicle-to-pedestrian (V2P) communications, and/or the like). Accordingly, in some implementations, the vehicle state data received from the vehicle may indicate whether the vehicle is turned on or off and/or provide various operational parameters associated with the vehicle (e.g., an engine temperature, whether an instrument panel is turned on and running from a battery, and/or the like).

In some implementations, as noted above, the IoT platform may be a connected vehicle platform that can communicate with and/or control the vehicle, a connected home platform that can monitor and control lighting, climate such as temperature, ventilation, and/or the like, appliances, access control and alarm systems such as a garage door system, exterior doors, and/or the like. Accordingly, when the IoT platform implements the functionality of a connected vehicle platform, the IoT platform may receive, from the vehicle, information related to the state of the vehicle, which can be provided to the sensor device.

As shown in FIG. 1A, and by reference number 110, the sensor device may detect that the vehicle was left running based on the set of inputs related to the state of the vehicle. For example, in some implementations, the sensor device may detect that the vehicle was left running based on one or more machine learning models, one or more rules, and/or the like, which may be trained, defined, or otherwise configured to detect whether the vehicle was left running based on how the vehicle is expected to behave when the vehicle is on and further based on how the vehicle is expected to behave when the vehicle is turned off. In some implementations, the one or more machine learning models, the one or more rules, and/or the like may be configured based on training data, domain-specific knowledge, and/or the like associated with the specific vehicle (e.g., based on make, model, and year), a class of vehicles (e.g., sports utility vehicles, sedans, convertibles, and/or the like), a power source for the vehicle (e.g., whether the vehicle is powered by an internal combustion engine, an electric motor, or both), and/or other suitable criteria. In some implementations, the sensor device may be configured with a processor and local computational resources that can be used to execute the one or more machine learning models, interpret the one or more rules, and/or the like based on the set of inputs. Additionally, or alternatively, the sensor device may provide the set of inputs to another processing node (e.g., the IoT platform, a remote server, and/or the like), which may execute the one or more machine learning models, interpret the one or more rules, and/or the like based on the set of inputs and use a set of outputs of the one or more machine learning models, the rule interpretation, and/or the like to indicate whether the vehicle is running to the sensor device.

In some implementations, the vehicle may be determined to be running based on the set of inputs satisfying one or more rules reflecting how the vehicle behaves when turned on. For example, where the vehicle, the IoT platform, and/or the like provides vehicle state data to the sensor device, the vehicle state data may explicitly indicate whether the vehicle is turned on. In another example, where the vehicle has communication capabilities that provide an ability to report the vehicle state data to the sensor device, the IoT platform, and/or the like, the ability to transmit the vehicle state data may implicitly indicate that the vehicle is running (e.g., the vehicle may include one or more communication devices that can only transmit radio frequency signals while the vehicle is turned on). Furthermore, in some cases, the vehicle may include an instrument panel, an infotainment system, interior lights (e.g., a dome light, a courtesy light, and/or the like), exterior lights (e.g., headlights, taillights, and/or the like), and/or the like that can be turned on even when the engine (if present) is switched off. Accordingly, in such cases, the explicit indication received from the vehicle, the IoT platform, and/or the like may further indicate whether the vehicle is running from a battery or an engine, as these conditions may have varying consequences. More particularly, in either case, leaving the vehicle running can lead to wasted energy, including battery depletion. However, when the vehicle is left with the engine running, there is a further risk of carbon monoxide poisoning and/or wasted fuel that would not be present if the vehicle was running on a battery only.

Accordingly, in some implementations, the sensor device may be configured to determine that the vehicle is running based on any suitable combination of vehicle state data received from the vehicle, vehicle state data received from the IoT platform, and physical phenomena observed in the environment. For example, in some implementations, the sensor device may determine that the vehicle is running based on the set of inputs including a radio frequency signal transmitted by a communication device of the vehicle, an electromagnetic field generated by one or more components of the vehicle, an acoustic signal that may represent a vibration, sound, and/or the like generated by the vehicle (e.g., by an engine of the vehicle, an infotainment system of the vehicle, and/or the like), light emitted from the vehicle (e.g., from an interior or exterior lighting system, an instrument panel, an infotainment system, and/or the like), one or more chemical signals indicating that the exhaust is present (e.g., as the presence of exhaust may implicitly indicate that the vehicle is running), a temperature measurement that indicates a temperature increase (e.g., due the engine or motor radiating heat into the environment), a humidity measurement indicating that water vapor is present (e.g., because water vapor is another component of vehicle exhaust), and/or the like.

Figure 1B:
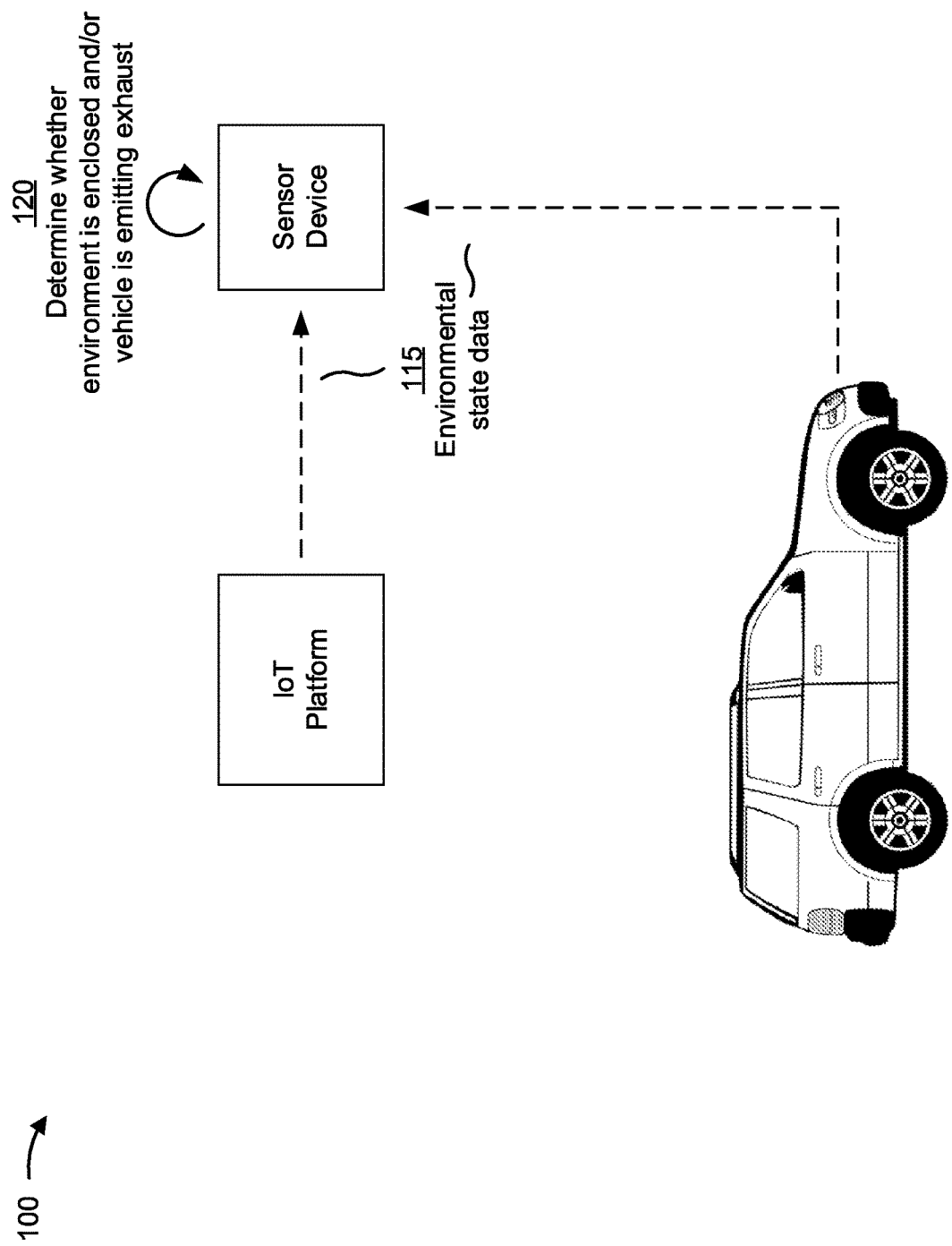

As shown in FIG. 1B, and by reference number 115, the sensor device may further receive a set of inputs related to a state of an environment in which the vehicle was left running. For example, as shown in FIG. 1B, the set of inputs related to the state of the environment may be received from the vehicle and/or from the IoT platform. Additionally, or alternatively, the sensor device may be configured to sense or otherwise detect one or more physical phenomena in the monitored environment. For example, as mentioned above, the sensor device may include an RF signal detector, a light sensor, an accelerometer, a temperature sensor, a smoke sensor, a gas (e.g., carbon monoxide) sensor, a proximity sensor, a magnetic sensor, an audio sensor, an electromagnetic sensor, a chemical sensor, a humidity sensor, a moisture sensor, and/or the like.

As shown in FIG. 1B, and by reference number 120, the sensor device may be configured to determine whether the environment is enclosed and/or whether the vehicle is emitting exhaust into the environment based on the set of inputs related to the state of the environment. For example, in some implementations, the vehicle may be equipped with one or more onboard cameras, proximity sensors, and/or the like that provide an ability to detect objects (e.g., closed doors) that may be located in front of or behind the vehicle. Accordingly, the vehicle may provide the sensor device with images obtained by the onboard cameras, image processing results, proximity sensor results, and/or the like, which can be used to determine whether the vehicle is in an enclosed space. In another example, the IoT platform may include or otherwise be associated with a connected home system that can indicate whether doors and/or windows in the environment are open or closed. In other examples, the sensor device may be deployed in a location near a garage door where a switch, accelerometer, magnetic object sensor, and/or the like can determine whether the garage door is open or closed, in communication with a garage door opener that indicates whether the garage door is open or closed, and/or the like.

In some implementations, the sensor device may further determine whether the vehicle is emitting exhaust into the environment based on the vehicle state data and the environmental state data. For example, where the vehicle state data indicates that the vehicle is a pure electric vehicle, the vehicle does not have an internal combustion engine and is therefore incapable of producing exhaust. Similarly, where the vehicle state data indicates that the vehicle was left running from a battery, but an ignition switch is turned off, the running vehicle will not produce any exhaust even though the running vehicle will be wasting energy until turned off. In a contrasting example, where the vehicle state data indicates that the vehicle was left with the engine running, the sensor device may infer that the vehicle is emitting exhaust, a potentially dangerous condition that may be worsened if the environment is enclosed. In still further examples, the environmental state data may indicate that exhaust is present in the environment where vibrations or sounds attributable to an engine running are sensed, where carbon monoxide is detected at a higher level than normal (e.g., 0.5 to 5 parts per million in an average home), where the air has a chemical composition reflecting the presence of exhaust (e.g., carbon monoxide from incomplete combustion, hydrocarbons from unburnt fuel, nitrogen oxides from excessive combustion temperatures, soot or other particulate matter, and/or the like).

In some implementations, the sensor device can be implemented as a standalone sensor device or a collection of multiple sensor devices deployed in a distributed architecture (e.g., a mesh architecture, a centralized architecture, and/or the like). For example, when implemented in a distributed architecture, the multiple sensor devices may be deployed in an array and/or another suitable topology that allows the multiple sensor devices to evaluate air quality and/or detect exhaust, carbon monoxide, and/or other toxic chemicals. For example, in some implementations, the multiple sensor devices may be deployed in a mesh architecture where one or more sensor devices are deployed to cover one or more walls, ceilings, and/or the like in one or more rooms (e.g., a garage, an interior room, and/or the like). In such cases, based on a threshold or percentage of the sensor devices indicating that carbon monoxide and/or other potentially toxic chemicals are detected, a condition could be triggered to ventilate the environment. Notably, in some implementations, the need to ventilate the environment may be determined independently of the state of the vehicle. For example, a leak in a natural gas line (e.g., to a gas range, a gas fireplace, a gas generator, a gas dryer, and/or the like) may pose a safety risk as potentially severe as a vehicle left running in an enclosed environment. Accordingly, the sensor device may be deployed in a house, office building, and/or another suitable premises in a standalone, distributed, and/or other suitable architecture where there may be a need for ventilation to prevent accidental suffocation due to carbon monoxide poisoning, a natural gas leak, and/or the like.

Accordingly, the vehicle state data and the environmental state data may include various parameters that can be used to detect and/or predict the presence of carbon monoxide and/or other potentially toxic chemicals in the environment, which the sensor device may evaluate when determining whether there may be a need to ventilate the environment and/or turn the vehicle off.

As shown in FIG. 1C, and by reference number 125, the sensor device may evaluate one or more conditions to determine whether to disengage the vehicle and/or ventilate the environment based on whether the vehicle was left running, whether the environment is enclosed, whether the vehicle is emitting exhaust into the environment, and/or the like. For example, in some cases, a user may intentionally start the vehicle and leave the engine running to warm the vehicle prior to driving on a cold day, to cool the vehicle prior to driving on a hot day, and/or the like. Additionally, or alternatively, the user may have temporarily left the vehicle running to go inside to pick up an item that the user forgot with the intention to immediately return to the vehicle. Accordingly, evaluating the one or more conditions may entail determining whether a user intended to leave the vehicle running, and if so, for what purpose.

In some implementations, the sensor device may evaluate various parameters that relate to user behaviors in combination with the one or more artificial intelligence algorithms (e.g., using machine learning models, a rules-based system, and/or the like) and information related to the vehicle, the environment, the user, and/or the like to predict whether to turn off the vehicle and/or ventilate the environment. For example, in some implementations, the parameters that relate to user behaviors may include input from a user device indicating that the user has started the vehicle for the purpose of warming or cooling the vehicle prior to driving. In another example, the sensor device may receive input relating to a user's calendar, which may indicate certain times when the user typically drives and/or is expected to drive (e.g., at a morning commute time, prior to a scheduled appointment, and/or the like). In another example, the sensor device may detect a sequence of events and/or times in which a user enters the environment, starts the vehicle, and exits the environment, which may reflect a behavior pattern typical of a user starting the vehicle for the purpose of warming or cooling the vehicle prior to driving. In still another example, where the vehicle is a connected vehicle, the sensor device may receive input indicating that the user initiated a remote start of the vehicle (e.g., from the vehicle, the IoT platform, and/or the like), in which case the remote start may be indicative of the user starting the vehicle for the purpose of warming or cooling the vehicle prior to driving. In yet another example, the user may have a typical behavior pattern in which the user parks the vehicle in the environment around a given time in the evening on workdays and does not use the vehicle again until the following morning.

In some implementations, the sensor device may further evaluate various parameters that relate to observed and/or expected locations of one or more devices in combination with the one or more artificial intelligence algorithms to predict whether to turn off the vehicle and/or ventilate the environment. For example, the sensor device may identify one or more devices that the user typically carries while driving (e.g., a key fob, a mobile phone, a wallet or briefcase equipped with a radio frequency identifier (RFID) tag, and/or the like). The sensor device may evaluate a current location associated with the one or more devices, a time-stamped set of locations associated with the one or more devices, and/or the like to predict whether to turn off the vehicle and/or ventilate the environment. For example, if a key fob, mobile phone, RFID-equipped object, and/or the like is determined to be a threshold distance away from the vehicle (i.e., not inside the vehicle), the sensor device may assign a higher score to a prediction that the user inadvertently left the vehicle running. On the other hand, where the key fob, mobile phone, RFID-equipped object, and/or the like are determined to be inside the vehicle, a relatively lower score may be assigned to the prediction that the user inadvertently left the vehicle running. Additionally, or alternatively, the score assigned to the prediction that the user inadvertently left the vehicle running may increase with an amount of time that the one or more devices are left in the vehicle. Furthermore, as noted above, a timestamped set of locations associated with the devices may be tracked, which may indicate a travel path associated with the devices that can be used to predict whether and/or when the user will return to the vehicle (e.g., in a few minutes, the next morning, and/or the like).

In this way, the sensor device may use one or more artificial intelligence algorithms (e.g., based on machine learning techniques, deep learning techniques, rules-based techniques, and/or the like) to evaluate various different parameters related to the state of the vehicle, the state of the environment, patterns in user behavior, device locations, and/or the like in combination with one another to predict whether to turn the vehicle off and/or ventilate the environment. In this way, the sensor device may distinguish circumstances in which the user may have inadvertently left the vehicle running in the environment from other circumstances that suggest that the user intended to start to the vehicle, will return to the vehicle (e.g., within a threshold time period), and/or the like.

Accordingly, in addition to being configured with intelligence and/or inputs that can be used to detect that a vehicle has been left running in the environment monitored by the sensor device (e.g., one or more machine learning models, one or more rules, vehicle state information, environmental state information, and/or the like), the intelligence and/or inputs may enable the sensor device to determine whether the vehicle is emitting exhaust into the environment, whether the environment is enclosed or ventilated (and/or a degree to which the environment is ventilated), and/or whether a user intended to leave the vehicle running. In some implementations, the sensor device may evaluate one or more conditions used to control whether the sensor device turns the vehicle off and/or ventilates the environment based on an evaluation of various parameters in combination.

For example, in some implementations, the sensor device may be configured to determine that the vehicle is not emitting exhaust into the environment if the vehicle is a pure electric vehicle (i.e., a vehicle lacking an internal combustion engine), or alternatively if the vehicle is running on battery power (e.g., in the case of a traditional vehicle or a hybrid electric vehicle where the ignition switch is turned off but an instrument panel, lighting system, and/or the like has been left on). On the other hand, the sensor device may be configured to determine that the vehicle is emitting exhaust into the environment if the vehicle is running from an internal combustion engine, one or more compounds that are typically contained in exhaust are detected in quantities that satisfy one or more threshold values, and/or the like. In some implementations, to determine whether the environment is enclosed or ventilated, the sensor device may evaluate sensor inputs and/or information received from the IoT platform, the vehicle, and/or the like to determine an open or closed state associated with an overhead garage door, whether the environment has one or more windows, an entry/exit door, and/or the like (and if so, whether any such window(s), door(s), and/or the like are open or closed), whether there is a fan running in the environment, and/or the like. Furthermore, as noted above, the sensor device may determine whether a user intended to leave the vehicle running based on one or more behavior patterns, input from a user calendar, information indicating that a remote start was initiated, weather conditions (e.g., the user may be more likely to start the vehicle before driving on days that are particularly cold or particularly hot), and/or the like. Accordingly, the sensor device may evaluate various parameters that relate to the state of the vehicle, the state of the environment, patterns of user behavior, device locations, and/or the like in combination with one another and in combination with domain-specific knowledge (e.g., machine learning model(s), rules, and/or the like) associated with the vehicle, the environment, the user, and/or the like to predict a need to turn off the vehicle and/or ventilate the environment.

In some implementations, the sensor device may calibrate one or more threshold values to determine whether to automatically disengage the vehicle and/or trigger one or more automated ventilation processes based on one or more of the above-mentioned factors. For example, the one or more threshold values may relate to a duration of time that the vehicle has been left running, a carbon monoxide level in the environment, an engine temperature, an air temperature inside the vehicle, an amount of time before the user is expected to return to the vehicle, and/or the like. In some implementations, the one or more threshold values may be calibrated to minimize wasted energy and/or to maximize safety. For example, assuming that the user did not intentionally leave the vehicle running, the duration of time that the vehicle can be left running before the sensor device will automatically disengage the vehicle may be calibrated to a first value (e.g., a few minutes) if the vehicle is running on battery power, to a second value that is less than the first value (e.g., one minute) if the vehicle is emitting exhaust but the environment is ventilated, or to a third value that is less than the second value (e.g., a few seconds) if the vehicle is emitting exhaust and the environment is enclosed.

In another example, the duration of time and/or the carbon monoxide level may be calibrated according to a size of the environment (e.g., carbon monoxide may accumulate to a dangerous level faster in a one-car garage attached to a building relative to a multi-car garage, a detached garage, an outdoor environment, and/or the like). Accordingly, to ensure that the vehicle is disengaged and that the environment is ventilated (if necessary), the duration of time and/or the carbon monoxide level may be calibrated to be satisfied before carbon monoxide accumulates in the environment to a dangerous level (i.e., such that ventilation and/or evacuation can occur before the onset of adverse health consequences). In some implementations, the threshold value(s) that are used to determine whether to disengage the vehicle and/or ventilate the environment based on the presence of exhaust in the environment may take priority over any threshold value(s) that are used to determine whether to disengage the vehicle based on wasted energy due to the safety hazards posed by carbon monoxide poisoning.

Accordingly, as shown in FIG. 1C, and by reference number 130, the sensor device may determine an amount of time that the vehicle has been left running in the environment monitored by the sensor device. For example, in some implementations, the sensor device may evaluate the set of parameters related to the state of the vehicle, the state of the environment, user behavior patterns, device locations, and/or the like based on determining that the vehicle is running and that the user has left the environment (e.g., based on a motion sensor indicating that the user left the environment, the IoT platform indicating that an interior door was opened and closed, a location reported by a device carried by the user, and/or the like). Additionally, or alternatively, the sensor device may be configured according to a geofence, where one or more processes to sense a state of the environment, sense a state of the vehicle, observe a user behavior pattern, track device locations, and/or the like are triggered upon determining that the vehicle has entered a defined area associated with the geofence (e.g., based on a location reported by the vehicle, a device belonging to a user who is a driver or passenger of the vehicle, and/or the like). Furthermore, as shown in FIG. 1C, and by reference number 135, the sensor device may determine a carbon monoxide level in the environment (e.g., where the vehicle is determined to be running from an internal combustion engine) based on the various parameters in the set of inputs, as described above. As further shown in FIG. 1C, and by reference number 140, the sensor device may further determine a temperature of an engine associated with the vehicle and/or an air temperature inside the vehicle based on determining that the user intentionally left the vehicle running (e.g., to warm or cool the vehicle prior to driving). In some implementations, the sensor device may evaluate the time that the vehicle has been left running, the carbon monoxide level, and the engine and/or air temperature in combination with various other parameters related to the state of the vehicle, the state of the environment, user behavior patterns, device locations, and/or the like to determine whether to turn the vehicle off and/or ventilate the environment.

Figure 1D:
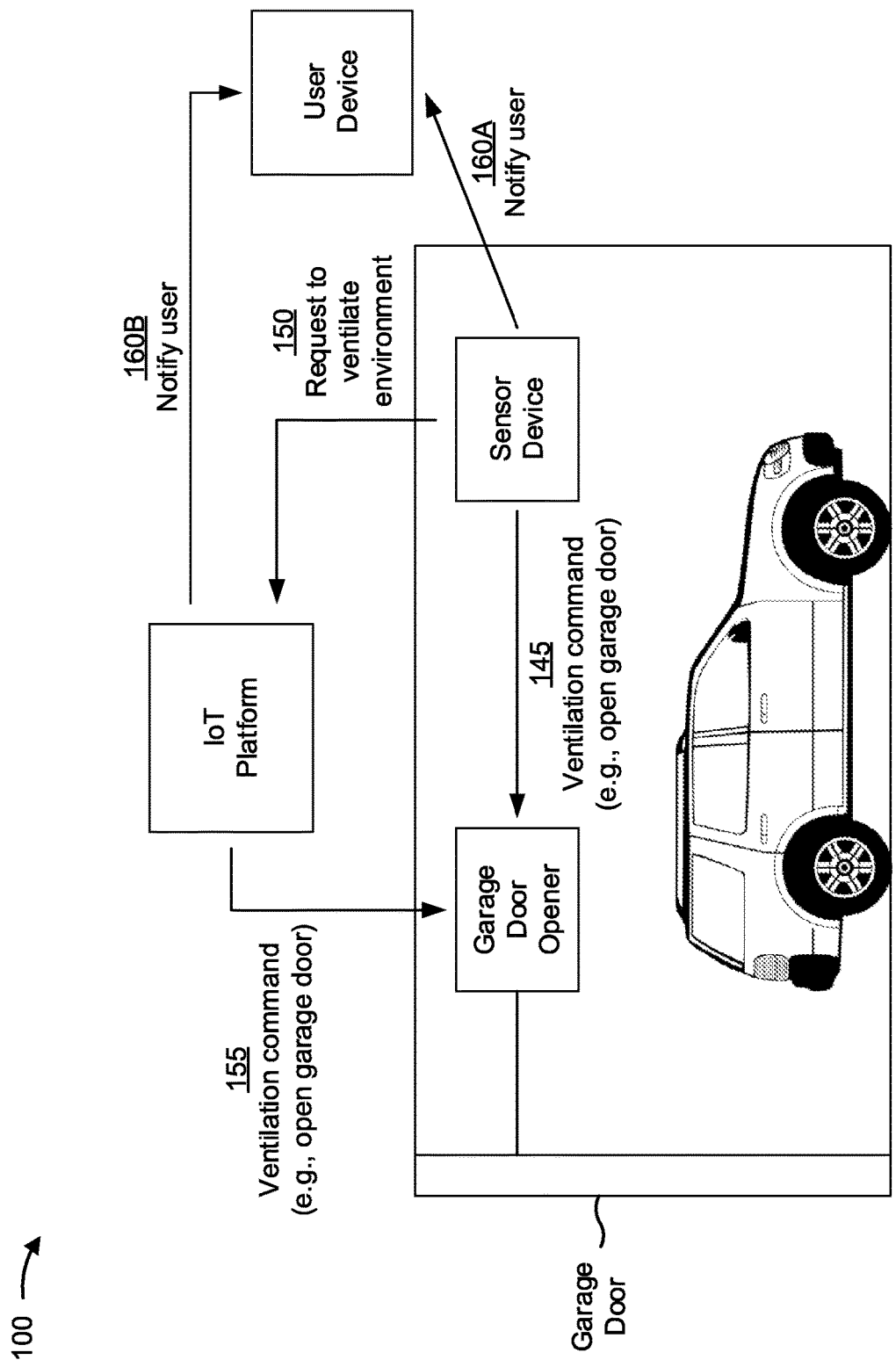

As shown in FIG. 1D, and by reference number 145, the sensor device may generate a ventilation command based on the various evaluated parameters indicating that a potentially unsafe condition exists or will soon exist unless the environment is ventilated (e.g., based on the amount of time that the vehicle has been left running, the carbon monoxide level in the environment, a threshold or percentage of sensor devices indicating that carbon monoxide and/or natural gas is detected, and/or the like). For example, in some implementations, the ventilation command may be transmitted or otherwise provided to a garage door opener, which may actuate an overhead garage door to ventilate the environment. Additionally, or alternatively, the ventilation command may cause one or more fans to turn on, which may circulate air in the environment and thereby aid in removing the toxic chemicals from the environment, reduce carbon monoxide accumulation through dispersing the exhaust over a larger volume of space, and/or the like. Additionally, or alternatively, the environment may include smart door or smart window technology that allows an entry/exit door, one or more windows, and/or the like to be automatically opened, in which case the ventilation command may be used to actuate the entry/exit door, the one or more windows, and/or the like. In this way, the potentially unsafe condition may be remedied before posing a safety risk to any person(s), pet(s), and/or the like.

As shown in FIG. 1D, and by reference number 150, the sensor device may additionally, or alternatively, transmit a request to ventilate the environment to the IoT platform (e.g., via a router or other network connecting the sensor device to the IoT platform, via a direct machine-to-machine (M2M) communication interface, and/or the like). For example, in some implementations, the IoT platform may include or otherwise be associated with a connected home platform that can control one or more devices in the environment (e.g., a home automation system, a home monitoring and control system, and/or the like). Accordingly, as shown in FIG. 1D, and by reference number 155, the IoT platform may transmit, relay, or otherwise provide the ventilation command to the garage door opener, which may actuate the overhead garage door to ventilate the exhaust from the environment. Additionally, or alternatively, the IoT platform may turn on one or more fans in the environment, actuate an entry/exit door, actuate one or more windows, turn on a range hood, turn on a heating, ventilation, and air conditioning (HVAC) system, and/or the like.

As shown in FIG. 1D, and by reference number 160A, the sensor device may transmit, to a user device, a notification to indicate that the environment was ventilated due to the presence of exhaust and/or carbon monoxide. As shown in FIG. 1D, and by reference number 160B, the IoT platform may additionally, or alternatively, transmit the notification to the user device. In this way, a user may be notified of the potential safety risk due to the possible presence of colorless, odorless, and tasteless carbon monoxide so that the user can initiate appropriate evacuation measures (if necessary), initiate manual ventilation measures (e.g., opening windows that cannot be automatically actuated), and/or the like before the onset of adverse health effects.

Figure 1E:
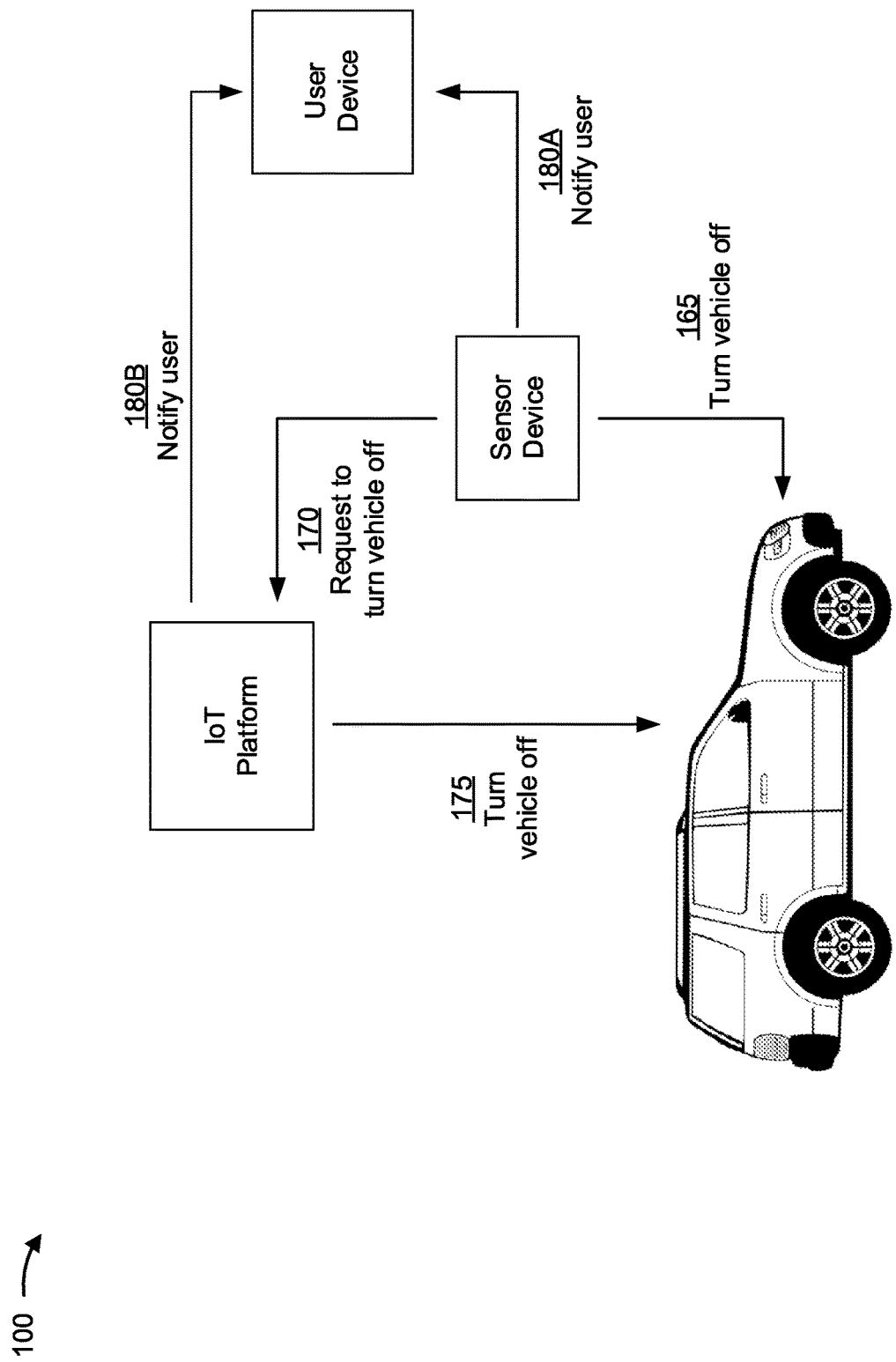

As shown in FIG. 1E, and by reference number 165, the sensor device may additionally, or alternatively, generate a command to turn the vehicle off based on the various evaluated parameters indicating that leaving the vehicle running would result in unnecessary wasted energy and/or a potentially unsafe condition (e.g., based on a prediction that the user inadvertently left the vehicle running and will not be returning to the vehicle, the amount of time that the vehicle has been left running, the carbon monoxide level in the environment, the vehicle engine temperature, the air temperature inside the vehicle, and/or the like). For example, in some implementations, the command to turn the vehicle off may be transmitted or otherwise provided to the vehicle, which may disengage an ignition switch, turn off an electric motor, turn off battery power, and/or the like. In this way, turning the vehicle off may conserve energy (e.g., fuel, battery power, electricity, and/or the like), and in cases where the vehicle is emitting exhaust into the environment, turning the vehicle off may stop the flow of exhaust and the associated dangerous compounds (most notably carbon monoxide) into the environment.

As shown in FIG. 1E, and by reference number 170, the sensor device may additionally, or alternatively, transmit a request to turn the vehicle off to the IoT platform (e.g., via a router or other network connecting the sensor device to the IoT platform, via a direct machine-to-machine (M2M) communication interface, and/or the like). For example, in some implementations, the IoT platform may include or otherwise be associated with a connected vehicle platform that can control the vehicle and/or one or more other devices in the environment. Accordingly, as shown in FIG. 1E, and by reference number 175, the IoT platform may transmit, relay, or otherwise provide the command to turn the vehicle off to the vehicle, which may disengage the ignition switch, turn off the electric motor, turn off the battery power, and/or the like.

As shown in FIG. 1E, and by reference number 180A, the sensor device may transmit, to the user device, a notification to indicate that the vehicle was turned off. As shown in FIG. 1E, and by reference number 180B, the IoT platform may additionally, or alternatively, transmit the notification to the user device. In this way, a user may be notified that the vehicle was left running, which may alert the user about the potential safety risk due to the possible presence of carbon monoxide and/or alert the user about possible wasted energy (e.g., so that the user can recharge the vehicle, plan to refill the gas tank, and/or the like). Furthermore, in cases where the user may have intentionally left the vehicle running to warm or cool the vehicle, transmitting the notification to the user device may alert the user that the engine temperature, air temperature, and/or the like has reached the target temperature such that the vehicle is ready to drive.

As indicated above, FIGS. 1A-1E are provided merely as one or more examples. Other examples may differ from what is described with regard to FIGS. 1A-1E.

Figure 2:
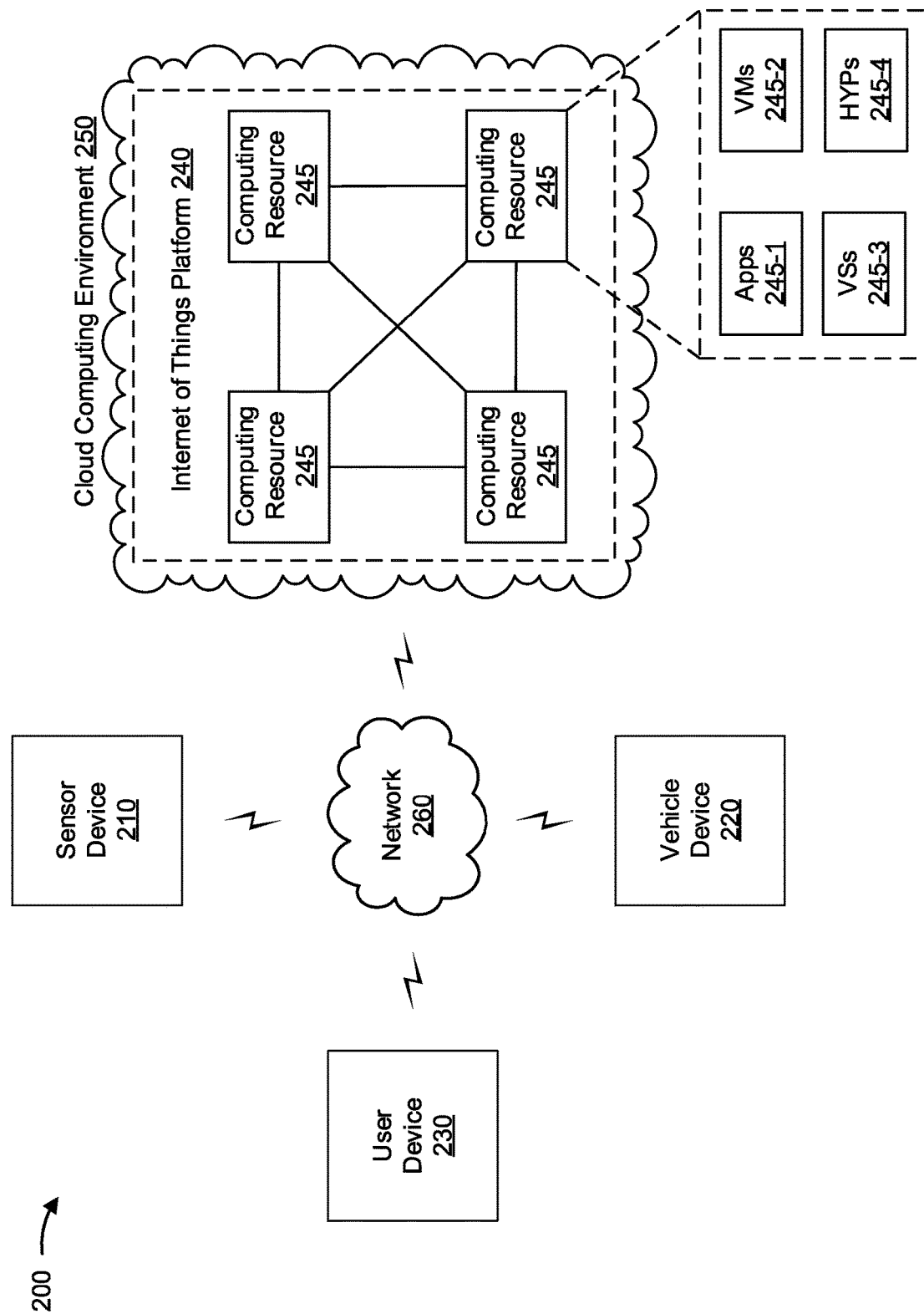
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a sensor device 210, a vehicle device 220, a user device 230, an Internet of Things platform 240, a computing resource 245, a cloud computing environment 250, and a network 260. Devices of environment 200 may interconnect via wired connections, wireless connections, or a combination of wired and wireless connections.

Sensor device 210 includes one or more wired or wireless devices capable of receiving, generating, storing, transmitting, processing, detecting, and/or providing information associated with detecting and disabling a parked vehicle that has been left running and/or ventilating an environment in which a parked vehicle is located. Example sensor devices 210 may include a temperature sensor, a moisture sensor, a humidity sensor, an accelerometer, a proximity sensor, a light sensor, a noise sensor, a pressure sensor, an ultrasonic sensor, a smoke sensor, a gas sensor (e.g., a carbon monoxide sensor, an oxygen sensor, a carbon dioxide sensor, and/or the like), a chemical sensor, an alcohol sensor, a positioning sensor, a capacitive sensor, a timing device, an infrared sensor, an active sensor (e.g., sensors that require an external power signal), a passive sensor (e.g., sensors that do not require an external power signal), a biological sensor, a radioactive sensor, a magnetic sensor, an electromagnetic sensor, an analog sensor, a digital sensor, and/or the like. Sensor device 210 may sense or detect a condition or information and send, using a wired or wireless communication interface, the detected condition or information to other devices in environment 200, such as Internet of Things platform 240. As an example, the sensor may be associated with a user device (e.g., a computer, a tablet computer, a laptop computer, a mobile phone, a smartphone, a wearable computer, etc.), such as user device 230, that senses information regarding the user and/or user device 230 via executing an application on user device 230. The information detected by user device 230 may be transmitted, using a communications interface on user device 230, to Internet of Things platform 240 for use in detecting and disabling a vehicle left running while parked and/or ventilating an environment in which a parked vehicle is located.

Vehicle device 220 includes one or more devices capable of receiving, generating, storing, processing, and/or providing information, such as information described herein. In some implementations, vehicle device 220 may include a device integrated within a vehicle, such as an in-vehicle infotainment (IVI) system, an in-car entertainment (ICE) system, a telematics device, a Global Positioning System (GPS) device, an electronic control module (ECM), or a similar type of device. In some implementations, vehicle device 220 may include a device that is separate from but associated with a vehicle, such as a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, vehicle device 220 may receive information from and/or transmit information to sensor device 210, user device 230, and/or Internet of Things platform 240, as described herein.

User device 230 includes one or more devices capable of receiving, generating, storing, processing, and/or providing information associated with detecting and disabling a vehicle left running while parked, such as receiving a notification that the vehicle was left running in the environment, that the environment was ventilated because the vehicle was emitting exhaust into the environment, that the vehicle was turned off, and/or the like. For example, user device 230 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Internet of Things platform 240 includes one or more computing resources assigned to detecting and disabling a vehicle that has been left running and/or ventilating an environment in which a parked vehicle is located. For example, Internet of Things platform 240 may be a platform implemented by cloud computing environment 250 that may provide sensor device 210 with information relating to a state of the vehicle and/or a state of an environment in which the vehicle was left running. Additionally, or alternatively, Internet of Things platform 240 may be implemented as a home automation platform, a connected vehicle platform, and/or the like configured to control one or more devices in or otherwise associated with environment 200, such as user device 230, vehicle device 220, and/or another suitable device (e.g., a garage door opener). In some implementations, Internet of Things platform 240 is implemented by computing resources 245 of cloud computing environment 250.

Internet of Things platform 240 may include a server device or a group of server devices. In some implementations, Internet of Things platform 240 may be hosted in cloud computing environment 250. Notably, while implementations described herein describe Internet of Things platform 240 as being hosted in cloud computing environment 250, in some implementations, Internet of Things platform 240 may be non-cloud-based or may be partially cloud-based.

Cloud computing environment 250 includes an environment that delivers computing as a service, whereby shared resources, services, etc. may be provided to sensor device 210, vehicle device 220, user device 230, and/or the like. Cloud computing environment 250 may provide computation, software, data access, storage, and/or other services that do not require end-user knowledge of a physical location and configuration of a system and/or a device that delivers the services. As shown, cloud computing environment 250 may include Internet of Things platform 240 and computing resource 245.

Computing resource 245 includes one or more personal computers, workstation computers, server devices, or another type of computation and/or communication device. In some implementations, computing resource 245 may host Internet of Things platform 240. The cloud resources may include compute instances executing in computing resource 245, storage devices provided in computing resource 245, data transfer devices provided by computing resource 245, etc. In some implementations, computing resource 245 may communicate with other computing resources 245 via wired connections, wireless connections, or a combination of wired and wireless connections.

As further shown in FIG. 2, computing resource 245 may include a group of cloud resources, such as one or more applications ("APPs") 245-1, one or more virtual machines ("VMs") 245-2, virtualized storage ("VSs") 245-3, one or more hypervisors ("HYPs") 245-4, or the like.

Application 245-1 includes one or more software applications that may be provided to or accessed by user device 230. Application 245-1 may eliminate a need to install and execute the software applications on user device 230. For example, application 245-1 may include software associated with Internet of Things platform 240 and/or any other software capable of being provided via cloud computing environment 250. In some implementations, one application 245-1 may send/receive information to/from one or more other applications 245-1, via virtual machine 245-2.

Virtual machine 245-2 includes a software implementation of a machine (e.g., a computer) that executes programs like a physical machine. Virtual machine 245-2 may be either a system virtual machine or a process virtual machine, depending upon use and degree of correspondence to any real machine by virtual machine 245-2. A system virtual machine may provide a complete system platform that supports execution of a complete operating system ("OS"). A process virtual machine may execute a single program and may support a single process. In some implementations, virtual machine 245-2 may execute on behalf of a user (e.g., user device 230), and may manage infrastructure of cloud computing environment 250, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 245-4 provides hardware virtualization techniques that allow multiple operating systems (e.g., "guest operating systems") to execute concurrently on a host computer, such as computing resource 245. Hypervisor 245-4 may present a virtual operating platform to the guest operating systems and may manage the execution of the guest operating systems. Multiple instances of a variety of operating systems may share virtualized hardware resources.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next-generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
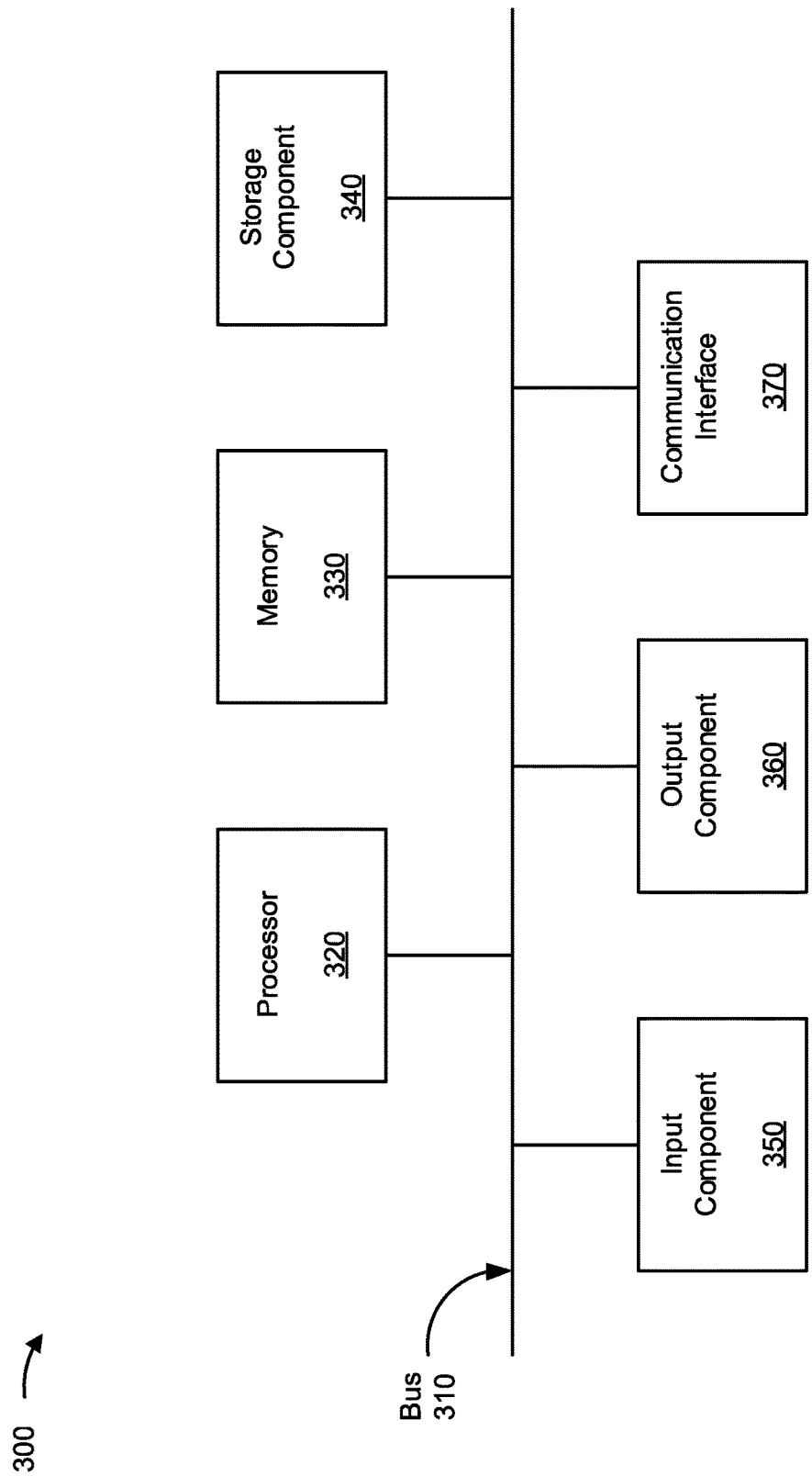
FIG. 3 is a diagram of example components of one or more devices of FIG. 2.

FIG. 3 is a diagram of example components of a device 300. Device 300 may correspond to sensor device 210, vehicle device 220, user device 230, Internet of Things platform 240, and/or computing resource 245. In some implementations, sensor device 210, vehicle device 220, user device 230, Internet of Things platform 240, and/or computing resource 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as one or more examples. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
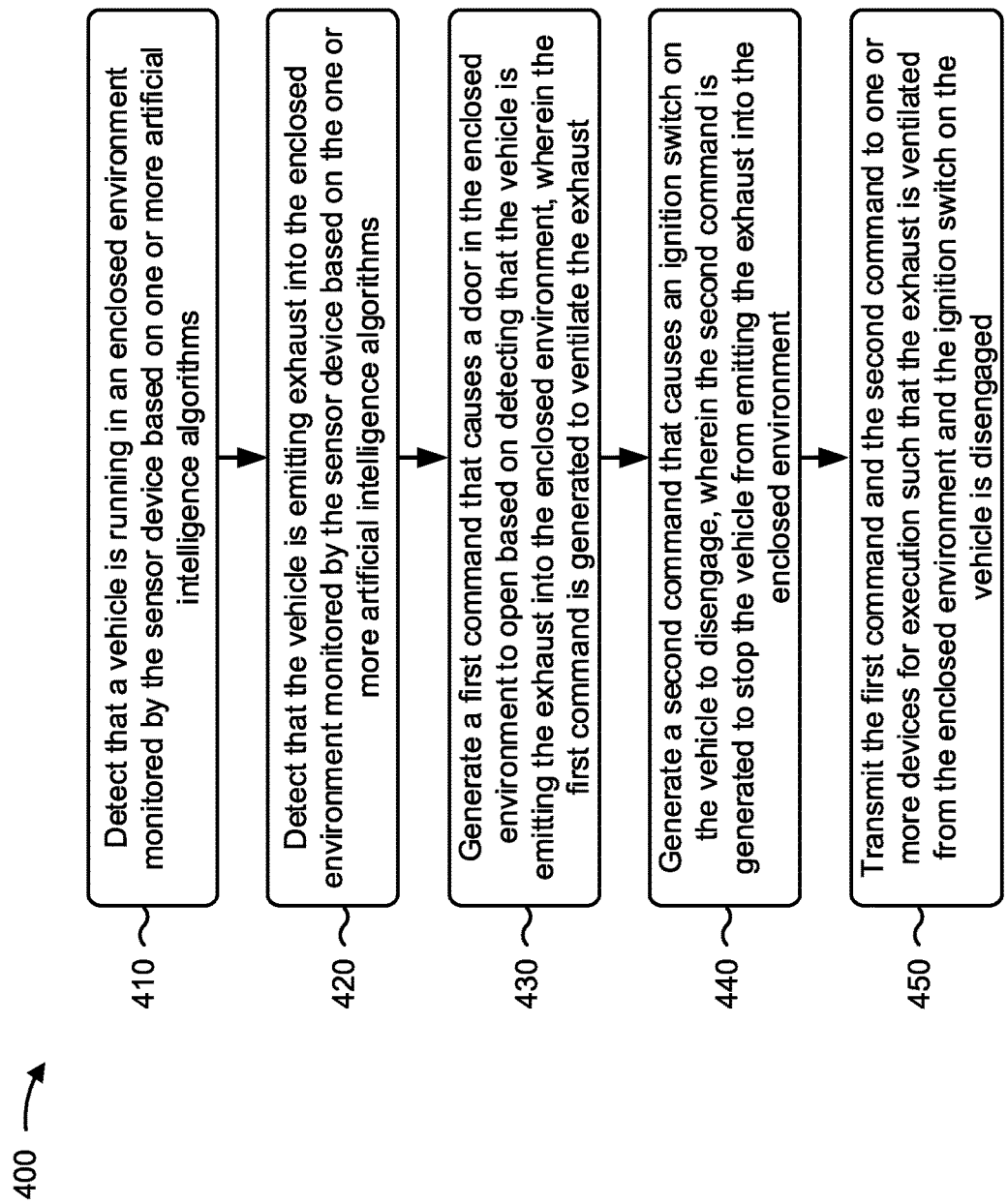
FIGS. 4-6 are flow charts of one or more example processes for detecting and disabling a vehicle left running while parked.

FIG. 4 is a flow chart of an example process 400 for detecting and disabling a vehicle left running while parked. In some implementations, one or more process blocks of FIG. 4 may be performed by a sensor device (e.g., sensor device 210). In some implementations, one or more process blocks of FIG. 4 may be performed by another device or a group of devices separate from or including the sensor device, such as a vehicle device (e.g., vehicle device 220), a user device (e.g., user device 230), an Internet of Things platform (e.g., Internet of Things platform 240), and a computing resource (e.g., computing resource 245).

As shown in FIG. 4, process 400 may include detecting that a vehicle is running in an enclosed environment monitored by the sensor device based on one or more artificial intelligence algorithms (block 410). For example, the sensor device (e.g., using a processor 320, a memory 330, a storage component 340, an input component 350, and a communication interface 370, and/or the like) may detect that a vehicle is running in an enclosed environment monitored by the sensor device based on one or more artificial intelligence algorithms, as described above.

As further shown in FIG. 4, process 400 may include detecting that the vehicle is emitting exhaust into the enclosed environment monitored by the sensor device based on the one or more artificial intelligence algorithms (block 420). For example, the sensor device (e.g., using a processor 320, a memory 330, a storage component 340, an input component 350, and a communication interface 370, and/or the like) may detect that the vehicle is emitting exhaust into the enclosed environment monitored by the sensor device based on the one or more artificial intelligence algorithms, as described above.

As further shown in FIG. 4, process 400 may include generating a first command that causes a door in the enclosed environment to open based on detecting that the vehicle is emitting the exhaust into the enclosed environment, wherein the first command is generated to ventilate the exhaust (block 430). For example, the sensor device (e.g., using a processor 320, a memory 330, a storage component 340, an input component 350, and a communication interface 370, and/or the like) may generate a first command that causes a door in the enclosed environment to open based on detecting that the vehicle is emitting the exhaust into the enclosed environment, as described above. In some implementations, the first command is generated to ventilate the exhaust.

As further shown in FIG. 4, process 400 may include generating a second command that causes an ignition switch on the vehicle to disengage, wherein the second command is generated to stop the vehicle from emitting the exhaust into the enclosed environment (block 440). For example, the sensor device (e.g., using a processor 320, a memory 330, a storage component 340, an input component 350, and a communication interface 370, and/or the like) may generate a second command that causes an ignition switch on the vehicle to disengage, as described above. In some implementations, the second command is generated to stop the vehicle from emitting the exhaust into the enclosed environment.

As further shown in FIG. 4, process 400 may include transmitting the first command and the second command to one or more devices for execution such that the exhaust is ventilated from the enclosed environment and the ignition switch on the vehicle is disengaged (block 450). For example, the sensor device (e.g., using a processor 320, a memory 330, a storage component 340, an output component 360, and a communication interface 370, and/or the like) may transmit the first command and the second command to one or more devices for execution such that the exhaust is ventilated from the enclosed environment and the ignition switch on the vehicle is disengaged, as described above.

Process 400 may include additional implementations, such as any single implementation or any combination of implementations described below and/or in connection with one or more other processes described elsewhere herein.

In some implementations, the one or more artificial intelligence algorithms may be configured to utilize one or more machine learning models, which may be trained to determine whether the vehicle is running based on a set of inputs related to a state of the vehicle. In some implementations, the one or more machine learning models may be trained to determine that the vehicle is running based on the set of inputs including a radio frequency signal transmitted by a communication device of the vehicle, an electromagnetic field generated by one or more components of the vehicle, an audio signal representing a sound generated by an engine of the vehicle running, light emitted from one or more of a lighting system, an instrument panel, and/or an infotainment system associated with the vehicle, one or more chemical signals indicating that the exhaust is present, a temperature measurement that indicates a temperature increase, or a humidity measurement indicating that water vapor produced by the vehicle is present.

In some implementations, the one or more machine learning models may be further trained to determine whether an environment is enclosed based on data related to one or more images. In some implementations, the first command and the second command may be generated based further on determining that a carbon monoxide level in the enclosed environment satisfies a threshold value. In some implementations, one or more of the first command or the second command may be generated based further on determining that an amount of time that the vehicle has been running in the enclosed environment satisfies a threshold value.

In some implementations, the first command may be generated based further on determining that a carbon monoxide level in the enclosed environment satisfies a first threshold value, where the second command is generated subsequent to the first command, and where the second command is generated based on determining that an engine temperature at the vehicle satisfies a second threshold value. In some implementations, the sensor device may transmit, to a user device, a notification indicating that the vehicle was left running in the enclosed environment.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
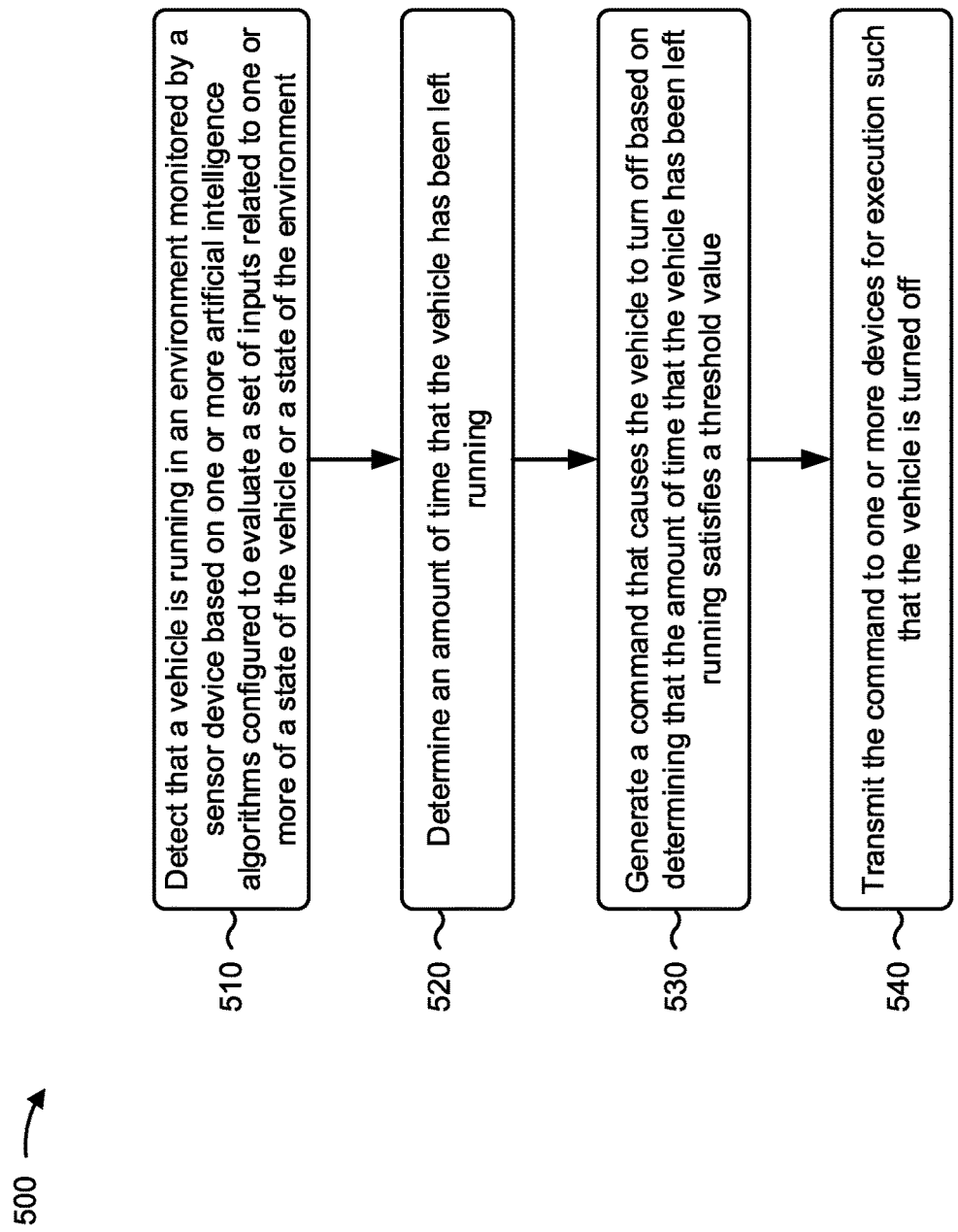

FIG. 5 is a flow chart of an example process 500 for detecting and disabling a vehicle left running while parked. In some implementations, one or more process blocks of FIG. 5 may be performed by a sensor device (e.g., sensor device 210). In some implementations, one or more process blocks of FIG. 5 may be performed by another device or a group of devices separate from or including the sensor device, such as a vehicle device (e.g., vehicle device 220), a user device (e.g., user device 230), an Internet of Things platform (e.g., Internet of Things platform 240), and a computing resource (e.g., computing resource 245).

As shown in FIG. 5, process 500 may include detecting that a vehicle is running in an environment monitored by the sensor device based on one or more artificial intelligence algorithms configured to evaluate a set of inputs related to one or more of a state of the vehicle or a state of the environment (block 510). For example, the sensor device (e.g., using a processor 320, a memory 330, a storage component 340, an input component 350, and a communication interface 370, and/or the like) may detect that the vehicle is running in the environment monitored by the sensor device based on one or more artificial intelligence algorithms that are configured to evaluate a set of inputs related to one or more of a state of the vehicle or a state of the environment, as described above.

As further shown in FIG. 5, process 500 may include determining an amount of time that the vehicle has been left running (block 520). For example, the sensor device (e.g., using a processor 320, a memory 330, a storage component 340, an input component 350, and a communication interface 370, and/or the like) may determine an amount of time that the vehicle has been left running, as described above.

As further shown in FIG. 5, process 500 may include generating a command that causes the vehicle to turn off based on determining that the amount of time that the vehicle has been left running satisfies a threshold value (block 530). For example, the sensor device (e.g., using a processor 320, a memory 330, a storage component 340, an input component 350, and a communication interface 370, and/or the like) may generate a command that causes the vehicle to turn off based on determining that the amount of time that the vehicle has been left running satisfies a threshold value, as described above.

As further shown in FIG. 5, process 500 may include transmitting the command to one or more devices for execution such that the vehicle is turned off (block 540). For example, the sensor device (e.g., using a processor 320, a memory 330, a storage component 340, an input component 350, and a communication interface 370, and/or the like)

may transmit the command to one or more devices for execution such that the vehicle is turned off, as described above.

Process 500 may include additional implementations, such as any single implementation or any combination of implementations described below and/or in connection with one or more other processes described elsewhere herein.

In some implementations, the command may be transmitted to an onboard communication device associated with the vehicle. In some implementations, the vehicle may be an electric vehicle in communication with an Internet of Things platform, and the sensor device may detect that the vehicle is running based further on information received from the Internet of Things platform that relates to the state of the vehicle.

In some implementations, the command may be a first command, the threshold value may be a first threshold value, and the sensor device may detect that the vehicle is emitting exhaust into the environment monitored by the sensor device based on the one or more artificial intelligence algorithms, may generate a second command that causes ventilation of the environment based on determining that the environment is enclosed, in combination with determining the amount of time that the vehicle has been left running satisfying the first threshold value, and/or a carbon monoxide level in the environment satisfying a second threshold value, and may transmit the second command to the one or more devices for execution such that the exhaust is ventilated from the environment.

In some implementations, the second command may be generated and executed prior to the first command based on one or more machine learning models indicating that a user intentionally left the vehicle running to warm or cool the vehicle prior to driving. In some implementations, the sensor device may determine that the environment is enclosed based on data related to one or more images captured using one or more onboard cameras associated with the vehicle, may determine a size of an area in which the vehicle is enclosed based on the data related to the one or more images captured using the one or more onboard cameras, and may calibrate one or more of the first threshold value or the second threshold value based on the size of the area in which the vehicle is enclosed.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
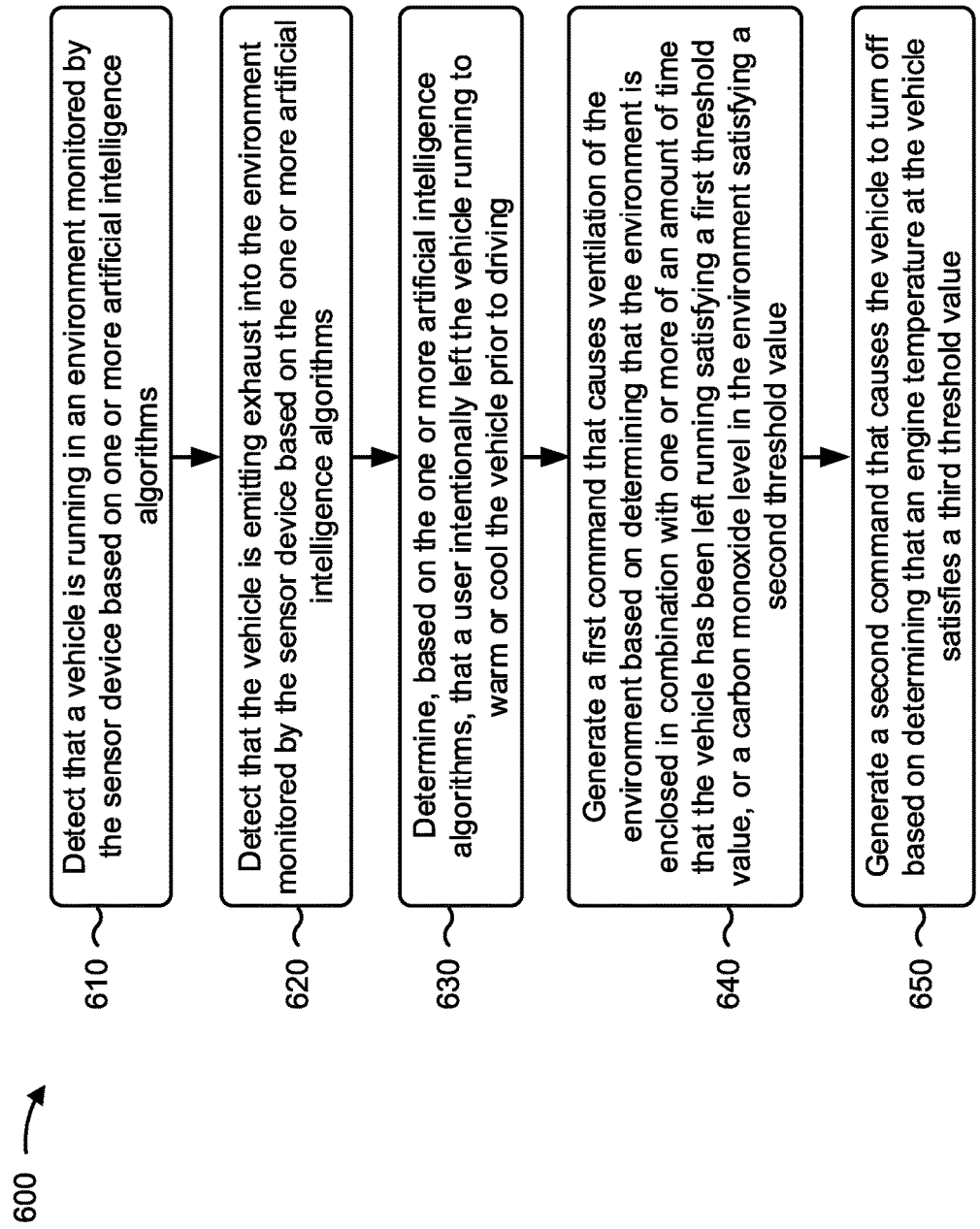

FIG. 6 is a flow chart of an example process 600 for detecting and disabling a vehicle left running while parked. In some implementations, one or more process blocks of FIG. 6 may be performed by a sensor device (e.g., sensor device 210). In some implementations, one or more process blocks of FIG. 6 may be performed by another device or a group of devices separate from or including the sensor device, such as a vehicle device (e.g., vehicle device 220), a user device (e.g., user device 230), an Internet of Things platform (e.g., Internet of Things platform 240), and a computing resource (e.g., computing resource 245).

As shown in FIG. 6, process 600 may include detecting that a vehicle is running in an environment monitored by the sensor device based on one or more artificial intelligence algorithms (block 610). For example, the sensor device (e.g., using a processor 320, a memory 330, a storage component 340, an input component 350, and a communication interface 370, and/or the like) may detect that a vehicle is running in an environment monitored by the sensor device based on one or more artificial intelligence algorithms, as described above.

As further shown in FIG. 6, process 600 may include detecting that the vehicle is emitting exhaust into the environment monitored by the sensor device based on the one or more artificial intelligence algorithms (block 620). For example, the sensor device (e.g., using a processor 320, a memory 330, a storage component 340, an input component 350, and a communication interface 370, and/or the like) may detect that the vehicle is emitting exhaust into the environment monitored by the sensor device based on the one or more artificial intelligence algorithms, as described above.

As further shown in FIG. 6, process 600 may include determining, based on the one or more artificial intelligence algorithms, that a user intentionally left the vehicle running to warm or cool the vehicle prior to driving (block 630). For example, the sensor device (e.g., using a processor 320, a memory 330, a storage component 340, an input component 350, and a communication interface 370, and/or the like) may determine, based on the one or more artificial intelligence algorithms, that a user intentionally left the vehicle running to warm or cool the vehicle prior to driving, as described above.

As further shown in FIG. 6, process 600 may include generating a first command that causes ventilation of the environment based on determining that the environment is enclosed in combination with one or more of: an amount of time that the vehicle has been left running satisfying a first threshold value, or a carbon monoxide level in the environment satisfying a second threshold value (block 640). For example, the sensor device (e.g., using a processor 320, a memory 330, a storage component 340, an input component 350, and a communication interface 370, and/or the like) may generate a first command that causes ventilation of the environment based on determining that the environment is enclosed in combination with one or more of: an amount of time that the vehicle has been left running satisfying a first threshold value, or a carbon monoxide level in the environment satisfying a second threshold value, as described above.

As further shown in FIG. 6, process 600 may include generating a second command that causes the vehicle to turn off based on determining that an engine temperature at the vehicle satisfies a third threshold value (block 650). For example, the sensor device (e.g., using a processor 320, a memory 330, a storage component 340, an input component 350, and a communication interface 370, and/or the like) may generate a second command that causes the vehicle to turn off based on determining that an engine temperature at the vehicle satisfies a third threshold value, as described above.

Process 600 may include additional implementations, such as any single implementation or any combination of implementations described below and/or in connection with one or more other processes described elsewhere herein.

In some implementations, the sensor device may determine that the user intentionally left the vehicle running based on information obtained from a calendar associated with the user, In some implementations, the sensor device may determine that the user intentionally left the vehicle running based on observing a sequence of events in which the user enters the environment, starts the vehicle, and leaves the environment. In some implementations, the sensor device may determine that the user intentionally left the vehicle running based on information received from an Internet of Things platform indicating that the user remotely started the vehicle.

In some implementations, the sensor device may transmit, to a device associated with the user, a notification to indicate that the engine temperature at the vehicle satisfies the third threshold value, In some implementations, the sensor device may transmit, to a device associated with the user, a notification to indicate a potentially unsafe condition based on the vehicle emitting the exhaust into the environment.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    detecting, at a sensor device that is remote from a vehicle, that the vehicle is running based on one or more artificial intelligence algorithms,
        wherein the sensor device is monitoring an enclosed environment;
    detecting, at the sensor device, that the vehicle is emitting exhaust into the enclosed environment based on the one or more artificial intelligence algorithms;
    generating, at the sensor device, a first command that causes the enclosed environment to become a ventilated environment based on detecting that the vehicle is emitting the exhaust into the enclosed environment,
        wherein the first command is generated to ventilate the exhaust;
    transmitting, by the sensor device and based on generating the first command, the first command to a first device for execution such that the exhaust is ventilated from the ventilated environment;
    determining, at the sensor device, whether the vehicle has been left running in an environment for a threshold period of time,
        wherein the environment is the enclosed environment or the ventilated environment;
    generating, at the sensor device, a second command that causes an ignition switch on the vehicle to disengage based on determining that the vehicle has been left running in the environment for the threshold period of time;
    and
    transmitting, by the sensor device and based on generating the second command, the second command to a second device for execution such that the ignition switch on the vehicle is disengaged.

2. The method of claim 1, wherein the one or more artificial intelligence algorithms are configured to utilize one or more machine learning models that are trained to determine whether the vehicle is running based on a set of inputs related to a state of the vehicle.

3. The method of claim 2, wherein the one or more machine learning models are trained to determine that the vehicle is running based on the set of inputs including one or more of:
    a radio frequency signal transmitted by a communication device of the vehicle,
    an electromagnetic field generated by one or more components of the vehicle,
    an audio signal representing a sound generated by an engine of the vehicle running,
    light emitted from one or more of a lighting system, an instrument panel, or an infotainment system associated with the vehicle,
    one or more chemical signals indicating that the exhaust is present,
    a temperature measurement that indicates a temperature increase, or
    a humidity measurement indicating that water vapor produced by the vehicle is present.

4. The method of claim 2, wherein the one or more machine learning models are further trained to determine whether the environment is enclosed based on data related to one or more images.

5. The method of claim 1, wherein the first command is generated based further on determining that a carbon monoxide level in the enclosed environment satisfies a threshold value.

6. The method of claim 1, wherein the first command is generated based further on determining that a carbon monoxide level in the enclosed environment satisfies a first threshold value, and
   wherein the second command is generated based on determining that an engine temperature at the vehicle satisfies a second threshold value.
7. The method of claim 1, further comprising:
   transmitting, to a user device, a notification indicating that the vehicle was left running in the environment.
8. A sensor device, comprising:
   one or more memories; and
   one or more processors operatively coupled to the one or more memories and configured to:
   detect that a vehicle is running based on one or more artificial intelligence algorithms,
   wherein the sensor device is monitoring an enclosed environment, and
   wherein sensor device is remote from the vehicle;
   detect whether the vehicle is emitting exhaust into the enclosed environment based on the one or more artificial intelligence algorithms;
      generate a first command that causes the enclosed environment to become a ventilated environment based on detecting that the vehicle is emitting the exhaust into the enclosed environment,
         wherein the first command is generated to ventilate the exhaust;
      transmit, based on generating the first command, the first command to a first device for execution such that the exhaust is ventilated from the ventilated environment;
      determine whether the vehicle has been left running in an environment for a threshold period of time,
         wherein the environment is the enclosed environment or the ventilated environment;
      generate a second command that causes an ignition switch on the vehicle to disengage based on determining that the vehicle has been left running in the environment for the threshold period of time; and
      transmit, based on generating the second command, the second command to a second device for execution such that the ignition switch on the vehicle is disengaged.
9. The sensor device of claim 8, wherein the one or more artificial intelligence algorithms are configured to utilize one or more machine learning models that are trained to determine whether the vehicle is running based on a set of inputs related to a state of the vehicle.
10. The sensor device of claim 9, wherein the one or more machine learning models are trained to determine that the vehicle is running based on the set of inputs including one or more of:
   a radio frequency signal transmitted by a communication device of the vehicle,
   an electromagnetic field generated by one or more components of the vehicle,
   an audio signal representing a sound generated by an engine of the vehicle running,
   light emitted from one or more of a lighting system, an instrument panel, or an infotainment system associated with the vehicle,
   one or more chemical signals indicating that the exhaust is present,
   a temperature measurement that indicates a temperature increase, or
   a humidity measurement indicating that water vapor produced by the vehicle is present.
11. The sensor device of claim 9, wherein the one or more machine learning models are further trained to determine whether the environment is enclosed based on data related to one or more images.
12. The sensor device of claim 8, wherein the first command is generated based further on determining that a carbon monoxide level in the enclosed environment satisfies a threshold value.
13. The sensor device of claim 8, wherein the first command is generated based further on determining that a carbon monoxide level in the enclosed environment satisfies a first threshold value, and
   wherein the second command is generated based on determining that an engine temperature at the vehicle satisfies a second threshold value.
14. The sensor device of claim 8, wherein the one or more processors are further to:
   transmit, to a user device, a notification indicating that the vehicle was left running in the environment.
15. A non-transitory computer-readable medium storing instructions, the instructions comprising:
   one or more instructions that, when executed by one or more processors of a sensor device, ca use the one or more processors to:
   detect that a vehicle is running based on one or more artificial intelligence algorithms,
   wherein the sensor device is monitoring an enclosed environment, and
   wherein sensor device is remote from the vehicle;
   detect whether the vehicle is emitting exhaust into the enclosed environment based on the one or more artificial intelligence algorithms;
      generate a first command that causes the enclosed environment to become a ventilated environment to open based on detecting that the vehicle is emitting the exhaust into the enclosed environment,
         wherein the first command is generated to ventilate the exhaust;
      transmit, based on generating the first command, the first command to a first device for execution such that the exhaust is ventilated from the ventilated environment;
      determine whether the vehicle has been left running in an environment for a threshold period of time,
         wherein the environment is the enclosed environment or the ventilated environment;
      generate a second command that causes an ignition switch on the vehicle to disengage based on determining that the vehicle has been left running in the environment for the threshold period of time; and
      transmit, based on generating the second command, the second command to a second device for execution such that the ignition switch on the vehicle is disengaged.
16. The non-transitory computer-readable medium of claim 15, wherein the one or more artificial intelligence algorithms are configured to utilize one or more machine learning models that are trained to determine whether the vehicle is running based on a set of inputs related to a state of the vehicle.
17. The non-transitory computer-readable medium of claim 16, wherein the one or more machine learning models are trained to determine that the vehicle is running based on the set of inputs including one or more of:

a radio frequency signal transmitted by a communication device of the vehicle,
an electromagnetic field generated by one or more components of the vehicle,
an audio signal representing a sound generated by an engine of the vehicle running,
light emitted from one or more of a lighting system, an instrument panel, or an infotainment system associated with the vehicle,
one or more chemical signals indicating that the exhaust is present,
a temperature measurement that indicates a temperature increase, or
a humidity measurement indicating that water vapor produced by the vehicle is present.

18. The non-transitory computer-readable medium of claim 16, wherein the one or more machine learning models are further trained to determine whether the environment is enclosed based on data related to one or more images.

19. The non-transitory computer-readable medium of claim 15, wherein the first command is generated based further on determining that a carbon monoxide level in the enclosed environment satisfies a threshold value.

20. The non-transitory computer-readable medium of claim 15, wherein the first command is generated based further on determining that a carbon monoxide level in the enclosed environment satisfies a first threshold value, and
wherein the second command is generated based on determining that an engine temperature at the vehicle satisfies a second threshold value.

* * * * *